US010169400B2

(12) United States Patent
Gotoh et al.

(10) Patent No.: US 10,169,400 B2
(45) Date of Patent: *Jan. 1, 2019

(54) GEOGRAPHIC SPACE MANAGEMENT

(71) Applicant: International Business Machines Corporation, Armonk, NY (US)

(72) Inventors: Yasuhisa Gotoh, Yokohama (JP); Tomohiro Miyahira, Tokyo (JP); Taku Sasaki, Tokyo (JP); Makoto Tanibayashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/744,067

(22) Filed: Jun. 19, 2015

(65) Prior Publication Data

US 2016/0371326 A1 Dec. 22, 2016

(51) Int. Cl.
*G06F 17/30* (2006.01)
*G06T 11/00* (2006.01)
*G06T 11/20* (2006.01)
*G01C 21/32* (2006.01)

(52) U.S. Cl.
CPC ....... *G06F 17/30377* (2013.01); *G01C 21/32* (2013.01); *G06F 17/30061* (2013.01); *G06F 17/30241* (2013.01); *G06F 17/30356* (2013.01); *G06F 17/30383* (2013.01);
(Continued)

(58) Field of Classification Search
CPC . H04W 4/021; H04W 4/046; G06F 17/30061; G06F 17/30241; G06F 17/30356; G08G 1/00; G08G 1/096844; G08G 1/096883; G01C 21/32; G01C 21/26; G01C 21/34; G01C 21/3691; G01C 21/3679; G01C 21/3415
See application file for complete search history.

(56) References Cited

U.S. PATENT DOCUMENTS 6,028,550 A * 2/2000 Froeberg ................ G01C 21/28
342/357.29
6,038,444 A * 3/2000 Schipper ............ H04B 7/18541
455/421
6,150,961 A   11/2000 Alewine et al.
(Continued)

FOREIGN PATENT DOCUMENTS

CN   102147260 A    8/2011
CN   102231231 A   11/2011
(Continued)

OTHER PUBLICATIONS

IBM, "List of IBM Patents or Patent Applications Treated as Related (Appendix P)," Jun. 30, 2015, p. 1-2.
(Continued)

*Primary Examiner* — Merilyn P Nguyen
(74) *Attorney, Agent, or Firm* — Erik K. Johnson

(57) ABSTRACT

A system is provided that manages a geographic space including a route on which a moving object moves, including a subsystem operable to manage a map of the geographic space, and an update manager operable to change a boundary of an update block, which is a unit of an update contained in the map, according to an extent to which the update block is updated. Also provided is a method and computer program product.

10 Claims, 26 Drawing Sheets

(52) U.S. Cl.
CPC ............ *G06T 11/00* (2013.01); *G06T 11/203* (2013.01); *G06T 11/206* (2013.01)

(56) References Cited

U.S. PATENT DOCUMENTS

| | | | |
|---|---|---|---|
| 6,343,301 B1* | 1/2002 | Halt | G06F 17/30241 |
| | | | 701/450 |
| 7,395,151 B2 | 7/2008 | O'Neill et al. | |
| 7,447,588 B1 | 11/2008 | Xu et al. | |
| 7,689,348 B2 | 3/2010 | Boss et al. | |
| 7,710,421 B2 | 5/2010 | Muramatsu | |
| 7,899,611 B2 | 3/2011 | Downs et al. | |
| 7,979,172 B2 | 7/2011 | Breed | |
| 8,000,887 B2 | 8/2011 | Nathan et al. | |
| 8,396,652 B2 | 3/2013 | Nomura | |
| 8,428,876 B2* | 4/2013 | Lee | G01C 21/32 |
| | | | 701/451 |
| 8,620,510 B1 | 12/2013 | Meuth et al. | |
| 8,768,012 B2 | 7/2014 | Satoh | |
| 8,799,246 B2 | 8/2014 | Nomura et al. | |
| 8,818,608 B2 | 8/2014 | Cullinane et al. | |
| 8,850,013 B2 | 9/2014 | Waldman et al. | |
| 8,862,146 B2 | 10/2014 | Shatsky et al. | |
| 8,930,269 B2 | 1/2015 | He et al. | |
| 8,988,252 B2 | 3/2015 | Scholl et al. | |
| 2005/0065711 A1 | 3/2005 | Dahlgren et al. | |
| 2005/0246711 A1* | 11/2005 | Berstis | G06F 9/5061 |
| | | | 718/105 |
| 2006/0271280 A1* | 11/2006 | O'Clair | G06F 17/3087 |
| | | | 701/455 |
| 2007/0109303 A1* | 5/2007 | Muramatsu | G01C 21/32 |
| | | | 345/440 |
| 2007/0226004 A1* | 9/2007 | Harrison | G06Q 10/00 |
| | | | 705/26.1 |
| 2007/0241932 A1 | 10/2007 | Otero et al. | |
| 2008/0046134 A1 | 2/2008 | Bruce et al. | |
| 2009/0070024 A1 | 3/2009 | Burchard et al. | |
| 2009/0132469 A1* | 5/2009 | White | G06Q 10/00 |
| 2009/0138336 A1* | 5/2009 | Ashley, Jr. | G01S 5/0289 |
| | | | 455/456.1 |
| 2009/0248758 A1* | 10/2009 | Sawai | G01C 21/32 |
| 2009/0287405 A1 | 11/2009 | Liu et al. | |
| 2010/0036595 A1 | 2/2010 | Coy et al. | |
| 2010/0188265 A1 | 7/2010 | Hill et al. | |
| 2010/0199213 A1 | 8/2010 | Suzuki | |
| 2011/0037619 A1 | 2/2011 | Ginsberg et al. | |
| 2011/0205040 A1 | 8/2011 | Van Wiemeersch et al. | |
| 2012/0092187 A1 | 4/2012 | Scholl et al. | |
| 2012/0130944 A1* | 5/2012 | Masuda | G01C 21/32 |
| | | | 707/609 |
| 2012/0291049 A1 | 11/2012 | Park et al. | |
| 2013/0006925 A1 | 1/2013 | Sawai et al. | |
| 2013/0204524 A1 | 8/2013 | Fryer et al. | |
| 2013/0214939 A1* | 8/2013 | Washlow | G01S 7/003 |
| | | | 340/901 |
| 2013/0321397 A1 | 12/2013 | Chen et al. | |
| 2014/0120953 A1 | 5/2014 | Ingram et al. | |
| 2014/0136099 A1 | 5/2014 | Choi et al. | |
| 2014/0191858 A1 | 7/2014 | Morgan et al. | |
| 2014/0195214 A1 | 7/2014 | Kozloski et al. | |
| 2014/0195664 A1* | 7/2014 | Rahnama | G06F 17/30528 |
| | | | 709/223 |
| 2014/0236414 A1 | 8/2014 | Droz et al. | |
| 2014/0248899 A1 | 9/2014 | Emadzadeh et al. | |
| 2014/0278026 A1 | 9/2014 | Taylor | |
| 2014/0278029 A1 | 9/2014 | Tonguz et al. | |
| 2014/0289267 A1 | 9/2014 | Felix et al. | |
| 2015/0051822 A1 | 2/2015 | Joglekar | |
| 2015/0066284 A1 | 3/2015 | Yopp | |
| 2015/0120083 A1 | 4/2015 | Gurovich et al. | |
| 2015/0149019 A1 | 5/2015 | Pilutti et al. | |
| 2015/0179077 A1 | 6/2015 | Morgan et al. | |
| 2016/0012729 A1* | 1/2016 | Del Vecchio | G08G 1/20 |
| | | | 340/994 |
| 2016/0334237 A1* | 11/2016 | Wang | G08G 1/0968 |

FOREIGN PATENT DOCUMENTS

| | | |
|---|---|---|
| CN | 102997928 A | 3/2013 |
| CN | 103247176 A | 8/2013 |
| CN | 103258043 A | 8/2013 |
| CN | 103971529 A | 8/2014 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2007286706 A | 11/2007 |
| JP | 2008123197 A | 5/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 2011158339 A | 8/2011 |
| JP | 4985119 B2 | 7/2012 |
| JP | 2012150515 A | 8/2012 |
| JP | 2012155286 A | 8/2012 |
| JP | 2013045242 A | 3/2013 |
| JP | 2013101119 A | 5/2013 |
| JP | 2013101120 A | 5/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |
| WO | 2012167174 A1 | 12/2012 |
| WO | 2013167085 A2 | 11/2013 |

OTHER PUBLICATIONS

Gotoh et al., "Geographic Space Management," Filed on Jun. 19, 2015, p. 1-97, U.S. Appl. 14/744,052.

Gotoh et al., "Geographic Space Management," Filed on 25, 2015, p. 1-95, U.S. Appl. No. 14/750,298.

Gotoh et al., "Geographic Space Management," Filed on Jun. 25, 2015, p. 1-95, U.S. Appl. No. 14/750,334.

Gotoh et al., "Geographic Space Management," Filed on Jun. 19, 2015, p. 1-95, U.S. Appl. No. 14/744,056.

Gotoh et al., "Geographic Space Management," Filed on Jun. 19, 2015, p. 1-94, U.S. Appl. No. 14/744,066.

Gotoh et al., "Management of Moving Objects," Filed on Jun. 19, 2015, p. 1-46, U.S. Appl. No. 14/744,071.

Yamamoto, "Management of Moving Objects," Filed on Jun. 19, 2015, p. 1-59, U.S. Appl. No. 14/744,074.

IBM, "List of IBM Patents or Patent Applications Treated as Related (Appendix P)," Jul. 8, 2015, p. 1-2.

Gotoh et al., "Geographic Space Management," Filed on Jun. 25, 2015, p. 1-95, U.S. Appl. No. 14/750,298.

Gotoh et al., "Geographic Space Management," Filed on Jul. 8, 2015, p. 1-93, U.S. Appl. No. 14/793,934.

Gotoh et al., "Management of Events and Moving Objects," Filed on Jul. 7, 2015, p. 1-69, U.S. Appl. No. 14/792,805.

IBM, "List of IBM Patents or Patent Applications Treated as Related (Appendix P)," Aug. 12, 2015, p. 1-3.

Gotoh et al., "Geographic Space Management," Filed on Jul. 16, 2015, p. 1-92, U.S. Appl. No. 14/800,774.

Gotoh et al., "Geographic Space Management," Filed on Jul. 16, 2015, p. 1-92, U.S. Appl. No. 14/800,782.

Gotoh et al., "Geographic Space Management," Filed on Jul. 16, 2015, p. 1-91, U.S. Appl. No. 14/800,795.

Gotoh et al., "Geographic Space Management," Filed on Jul. 16, 2015, p. 1-91, U.S. Appl. No. 14/800,811.

Gotoh et al., "Geographic Space Management," Filed on Jun. 19, 2015, p. 1-93, U.S. Appl. No. 14/744,067.

Gotoh et al., "Geographic Space Management," Filed on Jul. 16, 2015, p. 1-91, U.S. Appl. No. 14/800,821.

Gotoh et al., "Geographic Space Management," Filed on Jul. 16, 2015, p. 1-91, U.S. Appl. No. 14/800,839.

(56) References Cited

OTHER PUBLICATIONS

Gotoh et al., "Management of Moving Objects," Filed on Jul. 17, 2015, p. 1-46, U.S. Appl. No. 14/802,289.
Gotoh et al., "Management of Moving Objects," Filed on Jul. 17, 2015, p. 1-46, U.S. Appl. No. 14/802,316.
Yamamoto, "Management of Moving Objects," Filed on Jul. 17, 2015, p. 1-58, U.S. Appl. No. 14/802,343.
Yamamoto, "Management of Moving Objects," Filed on Jul. 17, 2015, p. 1-58, U.S. Appl. No. 14/802,361.
Gotoh et al., "Management of Events and Moving Objects," Filed on Jul. 16, 2015, p. 1-68, U.S. Appl. No. 14/801,014.
Gotoh et al., "Management of Events and Moving Objects," Filed on Jul. 16, 2015, p. 1-68, U.S. Appl. No. 14/801,054.
IBM, "List of IBM Patents or Patent Applications Treated as Related (Appendix P)," Mar. 28, 2016, p. 1-3.
Gotoh et al., "Geographic Space Management," Application and Drawings, Filed on Jun. 19, 2015, p. 1-97, U.S. Appl. No. 14/744,052.
Gotoh et al., "Geographic Space Management," Application and Drawings, Filed on Jun. 25, 2015, p. 1-95, U.S. Appl. No. 14/750,298.
Gotoh et al., "Geographic Space Management," Application and Drawings, Filed on Jun. 25, 2015, p. 1-95, U.S. Appl. No. 14/750,334.
Gotoh et al., "Geographic Space Management," Application and Drawings, Filed on Jul. 8, 2015, p. 1-93, U.S. Appl. No. 14/793,934.
Gotoh et al., "Geographic Space Management," Application and Drawings, Filed on Jun. 19, 2015, p. 1-95, U.S. Appl. No. 14/744,056.
Gotoh et al., "Geographic Space Management," Application and Drawings, Filed on Jul. 16, 2015, p. 1-92, U.S. Appl. No. 14/800,774.
Gotoh et al., "Geographic Space Management," Application and Drawings, Filed on Jul. 16, 2015, p. 1-92, U.S. Appl. No. 14/800,782.
Gotoh et al., "Geographic Space Management," Application and Drawings, Filed on Jun. 19, 2015, p. 1-94, U.S. Appl. No. 14/744,066.
Gotoh et al., "Geographic Space Management," Application and Drawings, Filed on Jul. 16, 2015, p. 1-91, U.S. Appl. No. 14/800,795.
Gotoh et al., "Geographic Space Management," Application and Drawings, Filed on Jul. 16, 2015, p. 1-91, U.S. Appl. No. 14/800,811.
Gotoh et al., "Geographic Space Management," Application and Drawings, Filed on Jun. 19, 2015, p. 1-93, U.S. Appl. No. 14/744,067.
Gotoh et al., "Geographic Space Management," Application and Drawings, Filed on Jul. 16, 2015, p. 1-91, U.S. Appl. No. 14/800,821.
Gotoh et al., "Geographic Space Management," Application and Drawings, Filed on Jul. 16, 2015, p. 1-91, U.S. Appl. No. 14/800,839.
Gotoh et al., "Management of Moving Objects," Application and Drawings, Filed on Jun. 19, 2015, p. 1-46, U.S. Appl. No. 14/744,071.
Gotoh et al., "Management of Moving Objects," Application and Drawings, Filed on Jul. 17, 2015, p. 1-46, U.S. Appl. No. 14/802,289.
Gotoh et al., "Management of Moving Objects," Application and Drawings, Filed on Jul. 17, 2015, p. 1-46, U.S. Appl. No. 14/802,316.
Yamamoto, "Management of Moving Objects," Application and Drawings, Filed on Jun. 19, 2015, p. 1-59, U.S. Appl. No. 14/744,074.
Yamamoto, "Management of Moving Objects," Application and Drawings, Filed on Jul. 17, 2015, p. 1-58, U.S. Appl. No. 14/802,343.
Yamamoto, "Management of Moving Objects," Application and Drawings, Filed on Jul. 17, 2015, p. 1-58, U.S. Appl. No. 14/802,361.
Gotoh et al., "Management of Events and Moving Objects," Application and Drawings, Filed on Jul. 7, 2015, p. 1-69, U.S. Appl. No. 14/792,805.
Gotoh et al., "Management of Events and Moving Objects," Application and Drawings, Filed on Jul. 16, 2015, p. 1-68, U.S. Appl. No. 14/801,014.
Gotoh et al., "Management of Events and Moving Objects," Application and Drawings, Filed on Jul. 16, 2015, p. 1-68, U.S. Appl. No. 14/801,054.
Miyahira et al., "Management of Mobile Objects and Service Platform for Mobile Objects," Application and Drawings, Filed on Dec. 16, 2015, p. 1-69, U.S. Appl. No. 14/970,596.
Nishimura et al., "Management of Dynamic Events and Moving Objects," Application and Drawings, Filed on Dec. 16, 2015, p. 1-92, U.S. Appl. No. 14/970,600.
Ishikawa et al., "Management of Evacuation With Mobile Objects," Application and Drawings, Filed on Dec. 16, 2015, p. 1-50, U.S. Appl. No. 14/970,609.
Gotoh et al., "Geographic Space Management," Application and Drawings, Filed on Dec. 16, 2015, p. 1-72, U.S. Appl. No. 14/970,616.
Ishikawa et al., "Management of Mobile Objects and Resources," Application and Drawings, Filed on Dec. 16, 2015, p. 1-52, U.S. Appl. No. 14/970,626.
Gotoh et al., "Management of Mobile Objects," Application and Drawings, Filed on Dec. 16, 2015, p. 1-65, U.S. Appl. No. 14/970,631.
Ishikawa et al., "Management of Mobile Objects," Application and Drawings, Filed on Dec. 16, 2015, p. 1-78, U.S. Appl. No. 14/970,643.
IEEE, "Server—Definition," IEEE 100: The Authoritative Dictionary of IEEE Standards Terms, 2000, p. 1031, Seventh Edition.
IEEE, "System—Definition," IEEE 100: The Authoritative Dictionary of IEEE Standards Terms, 2000, p. 1143-1144, Seventh Edition.
Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.
Y et al., "A Complex Event Processing System Approach to Real Time Road Traffic Event Detection," Journal of Convergence Information Technology (JCIT), Oct. 2013, p. 142-148, vol. 8, No. 15.
IBM, "List of IBM Patents or Patent Applications Treated as Related (Appendix P)," Jun. 19, 2015, p. 1-2.
Abrougui et al., "Efficient load balancing and QoS-based location aware service discovery protocol for vehicular ad hoc networks," EURASIP Journal on Wireless Communications and Networking, Mar. 2012, p. 1-15, Springer.
Aulinas et al., "Local map update for large scale SLAM," Electronics Letters, Apr. 15, 2010, p. 1-2, vol. 46, No. 8.
Dangel et al., "Can Road Traffic Volume Information Improve Partitioning for Distributed SUMO?," Modeling Mobility with Open Data, Lecture Notes in Mobility, 2015, p. 61-74, Springer International Publishing.
DRM, "Local Dynamic Map," DRM Research Seminar, Jun. 30, 2010., p. 1-72, Japan Digital Road Map Association.
Hong et al., "A grid-based node split algorithm for managing current location data of moving objects," The Journal of Supercomputing, Dec. 2007, p. 321-337, vol. 42, Issue 3, Springer.
Hsu et al., "Automatic Traffic Monitoring Method Based on Cellular Model," Fifth International Conference on Intelligent Information Hiding and Multimedia Signal Processing, 2009, p. 640-643, IEEE Computer Society.
Ihm et al., "Advanced Spatial Data Management for Enterprise Applications," An Oracle White Paper, Aug. 2010, p. 1-16, Oracle Spatial 11g.
OpenStreetMap, "QuadTiles," OpenStreetMap Wiki, Last Modified on Mar. 3, 2014, p. 1-10, http://wiki.openstreetmap.org/wiki/QuadTiles, Accessed on Jun. 15, 2015.
Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.
Schade, "Sharing Data by Means of a Local Dynamic Map," Understanding the Standards for Cooperative ITS, Feb. 6, 2014, p. 1-10, MINES ParisTech, Transportation Sustainability Environment Consulting.
Suzumura et al., "X10-based Massive Parallel Large-Scale Traffic Flow Simulation," ProVISION, Winter 2012, p. 74-79, No. 72, IBM Professionals' Papers.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.

* cited by examiner

GEOGRAPHIC SPACE MANAGEMENT

BACKGROUND

The present invention relates to a system for managing geographic space.

As the geographic space being handled by a driving system expands, the amount of information being transmitted and received increases, and the corresponding requirements might exceed the processing power of a single server. Even if the geographic space is divided, and a plurality of servers are used to process the spaces resulting from the division, automobiles move at high speeds among the plurality of divided geographic spaces, and therefore further communication between the servers is necessary, such that the processing capability may be exceeded even when a plurality of servers are used. Furthermore, when the geographic space is divided, the density of roads, the number of moving automobiles, and the like is different in each geographic space resulting from the division, and therefore there is a difference in system resources and workloads among servers, such that an overall efficiency of the system may drop when a load is focused on a certain server.

SUMMARY

According to a first aspect of the present invention, a system is provided including a subsystem operable to manage a map of the geographic space including a route on which a moving object moves, and an update manager operable to change a boundary of an update block, which is a unit of an update contained in the map, according to an extent to which the update block is updated. A method and computer program product are also provided.

The summary clause does not necessarily describe all necessary features of the embodiments of the present invention. The present invention may also be a sub-combination of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
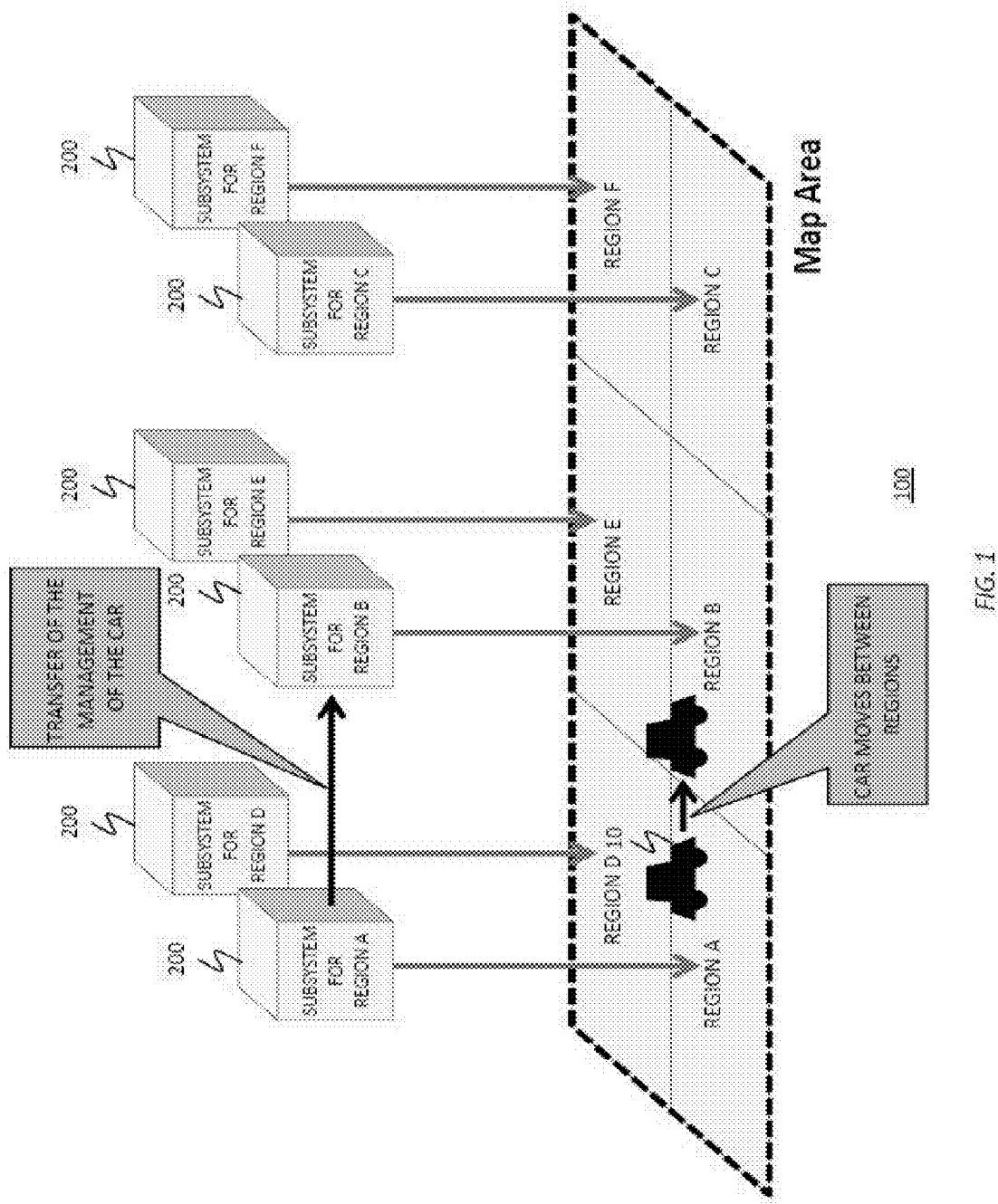
FIG. 1 shows a system and a map area corresponding to a geographic space managed by the system, according to an embodiment of the present invention.

FIG. 1 shows a system 100 and a map area corresponding to a geographic space managed by the system 100, according to an embodiment of the present invention. The system 100 manages a geographic space that includes routes on which a moving object 10 moves. The system 100 is operable to divide the geographic space into a plurality of regions, manage these regions, and dynamically change the boundary of at least one of the regions, which may improve the overall system efficiency. The moving object 10 may be a moving object that moves on routes including land routes, sea routes, and/or air routes, for example. The geographic space may be land, sea, or air space that includes the routes on which the moving object travels.

FIG. 1 shows an automobile as an example of the moving object 10, which moves along roads as examples of land routes. FIG. 1 shows an example in which the system 100 performs management by using map areas corresponding to a geographical area including a road on which the automobile is moving. The system 100 divides the map area into a plurality of regions and includes a plurality of subsystems 200 that respectively manage these regions. FIG. 1 shows an example in which the map area is divided into six regions from region A to region F, and six subsystems 200 respectively manage these six regions resulting from the division. In FIG. 1, region A to region F are shown as being separated from the subsystems 200, but each subsystem 200 may include a map of the corresponding region and these maps may be managed within the respective subsystems 200.

Each of the subsystems 200 may be implemented on a server, and portions of the system 100 other than the subsystems may also be implemented on one or more servers. In other words, the system 100 may be implemented on a plurality of servers. These servers may exist at any point on a network including the Internet, a subscriber network, a cellular network, or a desired combination of networks. The servers may be dedicated servers, or may be shared servers that perform other operations.

The system 100 acquires the positions of a moving object 10 from the moving object 10, and the subsystem 200 managing the region that includes the acquired position of the moving object 10 within the map area may manage the movement of this moving object 10. The system 100 acquires information such as events that have occurred to the moving object 10 and/or on the road outside, and the subsystem 200 managing the region including the position where such an event has occurred may manage the state of the event. Events may include information about accidents, obstructions, or construction on the road, or information about the weather, temperature, buildings, shops, or parking lots near the road. In response to a setting or a request from the moving object 10, the subsystem 200 may provide notification about the event information to the moving object 10 that made the request.

For example, if the moving object 10 is moving on a route in a geographical area corresponding to region A, then the subsystem 200 managing region A manages this moving object 10. The system 100 may increase or decrease the number of subsystems 200 according to the surface area of the geographic space to be managed.

Since the map area is divided into a plurality of regions, despite the moving object 10 simply moving on a route, the region corresponding to the position of the moving object 10 might change. FIG. 1 shows an example in which the moving object 10 is driving on a road such that the position of the moving object 10 moves from region A to region B. In this case, according to the movement of the moving object 10, the system 100 may transfer the information concerning the moving object 10 from the subsystem 200 managing region A to the subsystem 200 managing region B, and may also transfer the management of the moving object 10 to the subsystem 200 managing region B.

In this way, a transfer of management among the plurality of subsystems 200 occurs according to the movement of the moving object 10. Therefore, by transmitting and receiving information of moving objects 10 among the subsystems 200, the amount of information to be transmitted and received increases in response to an increase in the number of moving objects 10 and the number of routes. Furthermore, since the density of moving objects 10 and routes is not uniform among the regions, there are cases where the load may be overwhelming on a certain subsystem 200. Therefore, the system 100 of the present embodiment may dynamically change the boundary of at least one region to prevent a load imbalance and/or a decrease in productivity of the plurality of subsystems 200.

Figure 2:
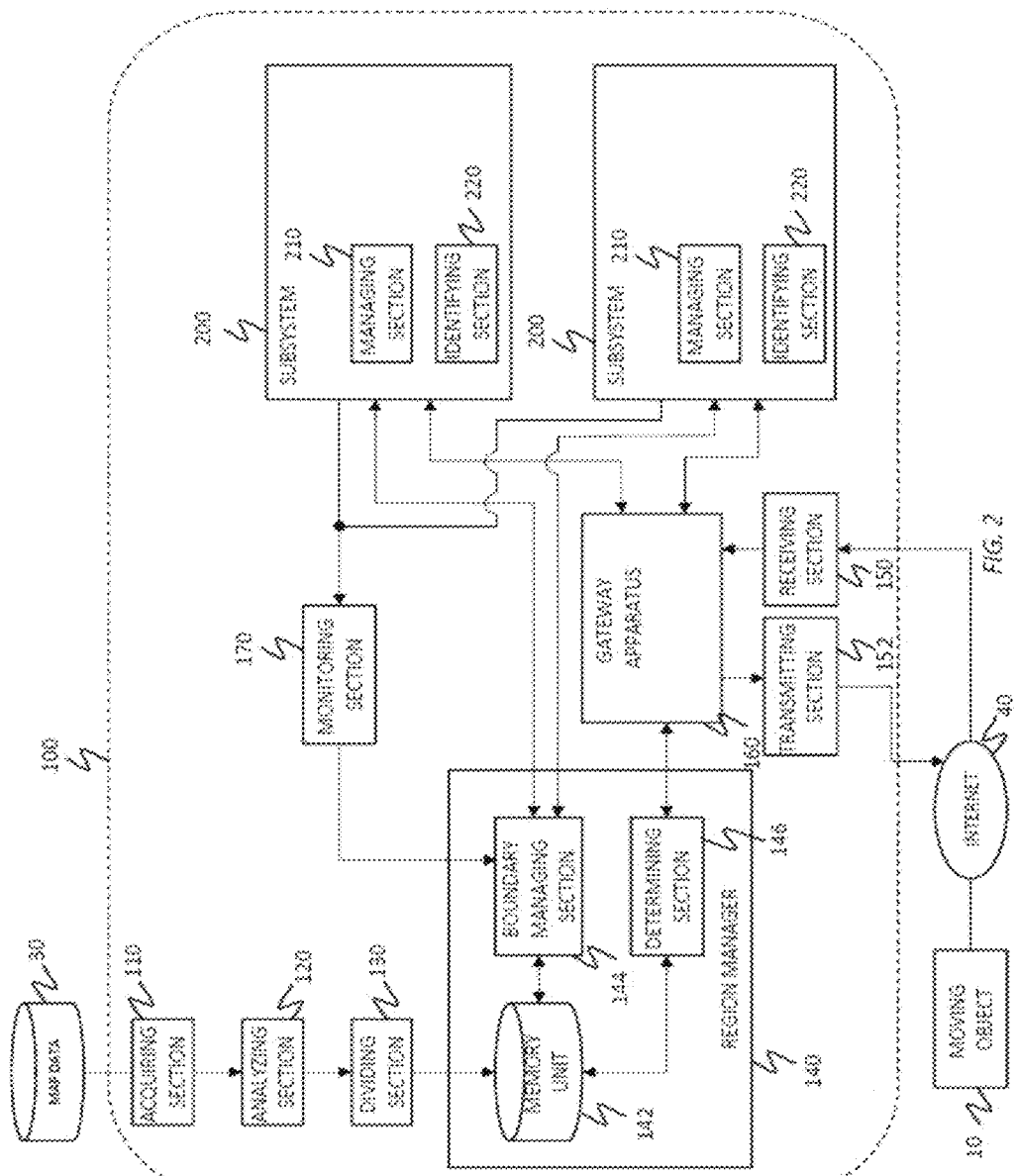
FIG. 2 shows an exemplary configuration of the system, according to an embodiment of the present invention.

FIG. 2 shows an exemplary configuration of the system 100, according to an embodiment of the present invention. The system 100 may be operable to communicate with each of a plurality of moving objects 10 to send and receive the information used to manage the moving objects 10. The system 100 may be operable to acquire map data and/or information exchanged with the moving objects 10, through the Internet, a subscriber network, a cellular network, or any desired combination of networks. The system 100 includes an acquiring section (i.e., module) 110, an analyzing section 120, a dividing section 130, a region manager 140, a receiving section 150, a transmitting section 152, a gateway apparatus 160, a monitoring section 170, and a plurality of subsystems 200.

The acquiring section 110 may be operable to acquire map data corresponding to the geographical areas where a moving object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire accident information, traffic information, weather information, time information, etc.

The analyzing section 120 may be operable to communicate with the acquiring section 110, and to analyze the map data to divide the map area into the plurality of regions. The analyzing section 120 may analyze route information included in the map data. The analyzing section 120 may analyze route information indicating the number of roads, traffic lights, railroad crossings, or the like, the type of roads, the number of lanes in each road, and the speed limit on each road, for example.

The dividing section 130 may be operable to communicate with the analyzing section 120, and to divide the map area into a plurality of regions. The dividing section 130 may divide the map area such that the loads of the subsystems 200 managing their respective regions are substantially uniform. The dividing section 130 may divide the map area such that the number of roads, traffic lights, railroad crossings, and the like in a single region is no greater than a threshold amount. Furthermore, the dividing section 130 may divide the map area such that the length of a type of road, e.g. a highway or a road only for automobiles, in a single region, is no greater than a threshold length. The dividing section 130 may divide the map area such that the length of roads having a certain number of lanes or speed limit in a single region is no greater than a threshold length.

The region manager 140 may be operable to store information concerning the plurality of regions resulting from the division. The region manager 140 may be operable to specify the subsystem 200 managing the region that includes the position of the moving object 10, according to the position of the moving object 10. The region manager 140 may be operable to adjust the loads of the plurality of subsystems 200 by dynamically changing the boundary of at least one of the plurality of regions. The region manager 140 may adjust the loads of the subsystems 200 by changing the boundary of a region managed by a subsystem 200 whose load is relatively higher than the loads of the other subsystems 200. The region manager 140 may be realized by one or more servers. The region manager 140 includes a memory unit 142, a boundary managing section 144, and a determining section 146.

The memory unit 142 may be operable to communicate with the dividing section 130 and store information concerning the plurality of regions resulting from the division by the dividing section 130. The memory unit 142 may store setting values or the like of the system 100. The memory unit 142 may store intermediate data, calculation results, threshold values, parameters, and the like that are generated by or used in the operations of the system 100. In response to a request from any component within the system 100, the memory unit 142 may supply the data stored therein to the component making the request. The memory unit 142 may be a computer readable storage medium such as an electric storage device, a magnetic storage device, an optical storage device, an electromagnetic storage device, or a semiconductor storage device.

The boundary managing section 144 may be operable to communicate with each of the subsystems 200 and change the boundary of the region being managed by at least one of the subsystems 200. The boundary managing section 144 may be operable to change the boundary of the region according to information such as the moving objects 10, the routes, and events occurring in each region managed by a subsystem 200 or according to information about the subsystems 200. The boundary managing section 144 may provide instructions for changing the boundary of one or more subsystems 200 adjacent to the boundary being changed. The boundary managing section 144 may communicate with the memory unit 142 and update the boundary information of the region(s) of which the boundary was changed.

The determining section 146 may be operable to communicate with the memory unit 142 and determine the subsystem 200 that is to manage the moving object 10 from the position information of the moving object 10, based on the information of the plurality of regions. The determining section 146 may identify a position in the map area managed by the system 100 that corresponds to the position information of the moving object 10, and determine the subsystem 200 that manages the region including the identified position in the map area to be the subsystem 200 for managing this moving object 10. The determining section 146 may store the position information of this moving object 10 and/or the determined subsystem 200 in the memory unit 142, in association with this moving object 10. The determining section 146 may store a history of the position information of this moving object 10 and/or the determined subsystem 200 in the memory unit 142.

Each of the boundary managing section 144, and determining section 146, may be a circuit, a shared or dedicated computer readable medium storing computer readable program instructions executable by a shared or dedicated processor, etc.

The receiving section 150 may be operable to receive information transmitted from each of a plurality of moving objects 10. Each moving object 10 may transmit information at designated time intervals, and the receiving section 150 may sequentially receive this transmitted information. The receiving section 150 may receive position information of the moving objects 10 and event information observed by the moving objects 10. The receiving section 150 may be operable to receive, as position information, observation information of a moving object 10 that is observed by other moving objects 10. The position information may be information that represents longitude and latitude in an absolute coordinate system, distance and direction from a reference point, etc. The position information may include height (altitude) information. The receiving section 150 may acquire the absolute position information or relative position information of the moving object 10.

The receiving section 150 may receive an observation position observed by the moving object 10 using GPS. The receiving section 150 may receive the observation information detected by the moving object 10 using a geomagnetic sensor, for example. The receiving section 150 may communicate with the plurality of moving objects 10 and receive the position information of each moving object 10, via the Internet 40. The receiving section 150 may receive the position information of the plurality of moving objects 10 through wireless communication, a subscriber network, a cellular network, or any desired combination of networks.

The transmitting section 152 may be operable to transmit event information to each of the moving objects 10 according to settings, for example. The transmitting section 152 may transmit information concerning the route on which the moving object 10 is expected to travel. The transmitting section 152 may communicate with the moving objects 10 and transmit each type of information to the moving objects 10 via the Internet 40. The transmitting section 152 may transmit each type of information to the moving objects 10 through wireless communication, a subscriber network, a cellular network, or any desired combination of networks.

The gateway apparatus 160 may be operable to transfer communication between the plurality of subsystems 200 and the plurality of moving objects 10. The gateway apparatus 160 may communicate with the receiving section 150 and receive the information transmitted by each moving object 10. The gateway apparatus 160 may communicate with the region manager 140 and request from the region manager 140 the transfer destination for each piece of information received from the moving objects 10. In response to this request, the gateway apparatus 160 may receive from the region manager 140 the information of the subsystem 200 that is to manage the moving object 10 that transmitted the information. The gateway apparatus 160 may transfer the information received from the moving object 10 to the subsystem 200 that is to manage the moving object 10. In other words, the gateway apparatus 160 may transfer the information received from each moving object 10 to the subsystem 200 determined by the region manager 140.

The gateway apparatus 160 may communicate with each of the subsystems 200 and receive the information transmitted by each subsystem 200. The gateway apparatus 160 may communicate with the transmitting section 152 and supply the transmitting section 152 with the information received from each subsystem 200, such that this information is transferred to the moving objects 10 designated for each subsystem 200.

The gateway apparatus 160 may include a plurality of gateways, and may quickly perform transfer between the plurality of subsystems 200 and the plurality of moving objects 10. In this case, the receiving section 150 may function as a load balancer that supplies the information from the moving objects 10, such that the load is spread among the plurality of gateways. The load balancer may sequentially supply information from the moving objects 10 to the gateways having lighter loads. The gateway apparatus 160 may be a network that provides a connection between a plurality of networks using the same or different types of protocols.

The monitoring section 170 may be operable to monitor the loads of each of the subsystems 200. The monitoring section 170 may communicate with the plurality of subsystems 200 and monitor the amount of traffic, the number of moving objects 10, the number of events, the number of roads, and the like in the map area managed by the subsystems 200. The monitoring section 170 may monitor the amount of data processed by each subsystem 200 and the amount of data transmitted and received by each subsystem 200. The monitoring section 170 may monitor the amount of heat generated by each subsystem 200 and the amount of memory used by each subsystem 200. The monitoring section 170 may communicate with the region manager 140 and supply the monitoring results to the region manager 140.

Each of the acquiring section 110, analyzing section 120, dividing section 130, gateway apparatus 160, receiving section 150, transmitting section 152, and monitoring section 170, may be a circuit, a shared or dedicated computer readable medium storing computer readable program instructions executable by a shared or dedicated processor, etc. The circuits, computer-readable mediums, and/or processors may be implemented in shared or dedicated servers.

The subsystems 200 may each be operable to manage one of the regions obtained by dividing the geographic space. Each subsystem 200 may manage the moving objects 10 positioned within the corresponding management target region, from among the plurality of moving objects 10. Each subsystem 200 may set one of the regions resulting from the division as a management target region, and may manage the mapping of the moving objects 10 that are management targets on a map of this management target region. Each subsystem 200 may be operable to manage events occurring within the corresponding management target region, and may manage mapping of these events on the map of this management target region.

Each subsystem 200 may begin data processing relating to a moving object 10 that is a new management target, in response to the region manager 140 changing the boundary of the management target region. In this case, in response to the change of the boundary, the subsystem 200 for which a new management target, e.g. a map, a moving object 10, an event, etc., has been generated may receive the information concerning this management target from the subsystem 200 that was managing this management target prior to the boundary change. Each subsystem 200 may stop managing the information of a management target in response to receiving information indicating the exclusion of the management target, or in response to supplying information indicating the addition of the management target to another subsystem 200, which may be due to the region manager 140 changing the boundary of the management target region. Each subsystem 200 includes a managing section 210 and an identifying section 220.

The managing section 210 provided in one subsystem 200 may manage the route information of the region managed by this subsystem 200, i.e. individual route information. The identifying section 220 provided in one subsystem 200 may identify the routes within the individual route information on which a moving object 10 is positioned, based on the position information received from the moving objects 10 in the region managed by this subsystem 200. In other words, the managing section 210 and the identifying section 220 may map the management target moving objects 10 on a map of the management target region, based on the position information received from the moving objects 10. The subsystem 200 may include a function known as LDM (Local Dynamic Map), by using the managing section 210 and the identifying section 220. Each of the managing section 210, and identifying section 220, may be a circuit, a shared or dedicated computer readable medium storing computer readable program instructions executable by a shared or dedicated processor, etc.

The system 100 of the present embodiment described above may manage a map area containing regions obtained by dividing a geographic space for a plurality of subsystems 200, along with moving objects 10 and events positioned within this map area. The region manager 140 dynamically changes the loads of the subsystems 200 by changing the boundary of at least one of the regions according to at least one of the data processing loads relating to the moving objects 10 and the number of moving objects 10 positioned in each of the regions, for example. In this way, the system 100 can prevent the loads placed on the servers among the subsystems 200 from exceeding the processing capacities of the servers. Furthermore, the system 100 can prevent a decrease in efficiency of the overall system due to a certain server among the subsystems 200 having an overwhelming load.

Figure 3:
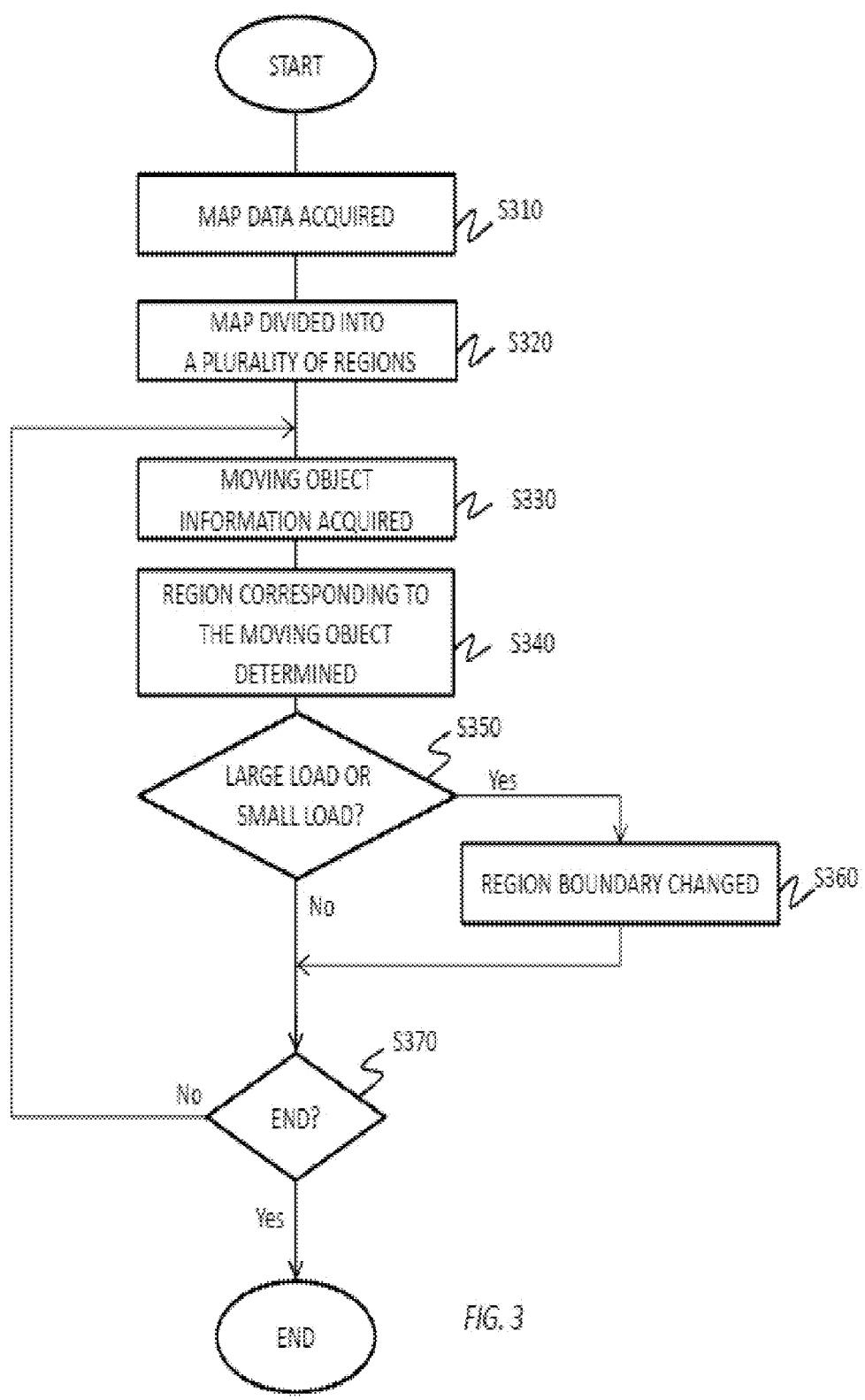
FIG. 3 shows an operational flow of a system, according to an embodiment of the present invention.

FIG. 3 shows an operational flow of a system, according to an embodiment of the present invention. The present embodiment describes an example in which the system performs operations from S310 to S370 shown in FIG. 3 to dynamically adjust the loads of the plurality of subsystems 200. FIG. 3 shows one example of the operational flow of the system 100 shown in FIG. 1, but the system 100 shown in FIG. 1 is not limited to using this operational flow, and the operational flow of FIG. 3 may be performed by other systems.

First, an acquiring section, such as the acquiring section 110, may acquire the map data of the geographic space to be managed by the system (S310). The acquiring section may acquire map data of a geographic space that includes one or more cities, one or more towns, and the like. The acquiring section may include map data of a geographic space including one or more states, countries, continents, etc.

Next, an analyzing section, such as the analyzing section 120, analyzes the acquired map area, and a dividing section, such as the dividing section 130, may divide the area of the map data (map area) according to this analysis (S320). The analyzing section may count the number of roads, the number of events, and the like in the map area. The analyzing section may analyze the map area by calculating the number of roads and the number of events per unit surface area. The dividing section may divide the map area into a plurality of regions according to the processing capability of a single subsystem. The dividing section may divide the map area into a number of regions that is less than the number of subsystems. The dividing section may store the information concerning the regions resulting from the division in a memory unit, such as the memory unit 142.

Next, a receiving section, such as the receiving section 150, may receive the information transmitted from each of a plurality of moving objects, such as moving object 10 (S330). The receiving section may receive the position information of each moving object. The receiving section may receive information concerning events observed by each of the moving objects, in addition to the position information. The receiving section may supply a gateway apparatus, such as the gateway apparatus 160, with the pieces of received information. The gateway apparatus may request the transfer destination of each piece of received information from the region manager.

Next, in response to the request from the gateway apparatus, the region manager may determine the regions in which the moving objects are positioned, based on the position information received from each of the moving objects, and may determine the subsystem for managing the maps of these regions from among a plurality of subsystems, such as the plurality of subsystems 200 (S340). Specifically, the region manager may determine each region in the map area in which a moving object is positioned, according to the position information of each moving object. The region manager may determine the subsystem to manage each determined region for each piece of position information, and provide notification to the gateway apparatus.

The gateway apparatus may transfer each piece of received information, with the subsystem corresponding to the position information as determined by the region manager serving as the transfer destination. The subsystems may each perform mapping of the received information on a map of the corresponding management target region. Specifically, each subsystem may map the management target moving objects that this subsystem manages, sequentially update the mapping according to position information sequentially transmitted from these moving objects, and manage the movement of these moving objects on the map.

Each subsystem may perform a search of a route from the position of a moving object on the map to a position where this moving object will arrive in the future. Each subsystem may search for a route to which the moving object is capable of moving in a threshold time, or may instead search for a route to a position on the map designated by the moving object or a recognized position, such as a landmark.

Each subsystem may map management target events on the map managed by this subsystem, and may transmit information concerning these events to the moving objects, according to settings or the like. In this way, the subsystems can notify a moving object of information concerning events occurring at positions near the position of the moving object. The subsystems can notify each moving object about information concerning the route relating to the movement direction of the moving object. The subsystems may provide an application that operates independently from the system with the position information, event information, route information, and the like of each moving object.

A monitoring section, such as the monitoring section 170, may monitor each of the subsystems and supply the region manager with the monitoring results. The region manager may determine whether or not the load placed on each subsystem is large (or small) (S350). Here, the region manager may determine whether the load placed on each subsystem is small. The region manager may determine whether or not the load of one subsystem is relatively large (or relatively small) compared to the other subsystems.

The region manager may determine whether or not the load of each subsystem is greater than (or less than) a threshold load. The region manager may determine whether or not the load placed on each subsystem is larger than a threshold load, in order of load size, beginning with the subsystem having the largest load. The region manager may determine whether or not the load placed on each subsystem is smaller than a threshold load, in order of load size, beginning with the subsystem having the smallest load.

The region manager may determine whether or not the load of one subsystem is both larger than the load of another subsystem and larger than a threshold load. The region manager may determine whether or not the load of one subsystem is both smaller than the load of another subsystem, and smaller than a threshold load. The region manager may determine whether to change the boundary of a region managed by a subsystem, according to the determination of the size of the load of this subsystem.

The region manager determines, for each region, whether to change the boundary of the region according to the number of moving objects in the region, the data processing load relating to the moving objects, the data processing load on the subsystem, the data processing load on the server, etc. The region manager may determine, for each region, whether to change the boundary of the region according to the number of events occurring in the region, the data processing load relating to these events, the data processing load on the subsystem, the data processing load on the server, etc.

The plurality of subsystems may calculate the complexity of the route network in each of the regions, and, according to the complexity, the region manager may determine whether to change the boundary of the corresponding region. In this case, if a plurality of subsystems have performed the route search, then the plurality of subsystems may calculate the complexity of the route network based on a history of the processing loads of the route searches performed in each of the regions. The region manager may determine, for each region, whether to change the boundary of the region according to the amount of traffic of the moving objects in the region. In this case, for each region, the region manager may determine whether to change the boundary of the region according to the amount of traffic of the moving objects moving between this region and the adjacent regions.

If the load of one or more of the subsystems is determined to be large or small (S350: Yes), then the region manager may change the boundary of the region managed by the subsystem having a load determined to be large or small (S360). The region manager may change the boundary of at least one region to decrease (or increase) the number of moving objects positioned within a partial region next to the boundary, the data processing load relating to those moving objects, etc. For example, the region manager balances the loads by changing the boundary of a region with a large load and transferring management of a portion of this region that has a large number of moving objects and/or a large data processing load relating to these moving objects to an adjacent region.

The region manager may change the boundary of at least one region to decrease (or increase) the number of events occurring within a range in the region, the data processing load relating to these events, etc. For example, the region manager balances the loads by changing the boundary of a region with a large load, and transferring management of a portion of this region that has a large number of events and/or a large data processing load relating to these events to an adjacent region.

The region manager may change the boundary of at least one region to decrease (or increase) the complexity of the route network within the region. For example, the region manager balances the loads by changing the boundary of a region with a large load, and transferring management of a portion of this region that has a highly complex route network to an adjacent region.

If a boundary of a region is positioned in the midst of a route portion where the traffic amount exceeds a predetermined reference traffic amount, then the region manager may change the boundary of the region such that the entire route portion is included in one of the adjacent regions. For example, the region manager balances the loads by changing the boundary of a region with a large load, and transferring management such that the entire route portion of this region that includes the route portion where the traffic amount exceeds the reference traffic amount is included in an adjacent region.

The region manager may change the boundary of a region such that the amount of traffic passing across the boundary of the region decreases. For example, the region manager may exclude or disqualify any boundary change candidate that is expected to cause the amount of traffic of moving objects crossing the boundary to increase relative to the amount of traffic crossing the boundary before the boundary of the region is changed. For example, the region manager may exclude or disqualify a boundary change candidate where the boundary would cross through a town from the boundary change candidates.

The region manager may change the boundary to a position expected to cause the traffic amount after the change to be less than the traffic amount of the moving objects crossing the boundary before the boundary of the region is changed. For example, the region manager may change the boundary such that the number of routes crossing the boundary is smaller than before the change, or may change the boundary such that smaller routes and routes with fewer curves cross the boundary than before the change.

In the manner described above, for each of the plurality of subsystems, the region manager may determine the magnitude of the load and adjust the balance of the loads. If it is determined that none of the loads of the subsystems are large or small (S350: No), then the region manager need not change the boundary of a region. In other words, the region manager may allow the subsystems to continue management with loads within a suitable range.

Next, the system may determine whether instructions have been received to suspend or stop operation (S370). If the program has ended, instructions have been received from the user of the system, or an emergency stop has occurred, for example (S370: Yes), then the system may end the operation.

If instructions for suspending or stopping the operation have not been received, then the system may return to the operation of S330 for receiving information from the moving objects and continue managing the subsystems. Until receiving instructions to suspend or stop the operation, the system may repeatedly perform the operations from S330 to S370 to continue the management of the subsystems while adjusting the loads of the subsystems.

In the manner described above, the system according to the present embodiment dynamically changes the boundaries of the regions managed by the subsystems, according to, for example, the load of each of the subsystems, and can therefor handle dynamic changes in events and the number of moving objects. For example, in response to the load of one subsystem becoming large, the system changes the boundary of the region managed by this subsystem in a manner that decreases the surface area of this region, and can therefore dynamically adjust the balance of the loads among the subsystems. Furthermore, in response to the load of one subsystem becoming small, the region manager may change the boundary of the region managed by this subsystem to increase the surface area of this region, and can therefore adjust the balance of the loads among the subsystems.

In this way, the system can manage the geographic space without exceeding the processing capabilities of the subsystems, and can prevent a decrease in efficiency of the overall system caused by an overwhelming load on a certain subsystem. Furthermore, the system changes the boundary of at least one region such that the amount of traffic crossing the border of this region managed by a subsystem decreases, and can therefore decrease the number of times that data is exchanged among the subsystems, thereby also decreasing the amount of data that is exchanged. In other words, even if the geographic space is increased, the system prevents an overwhelming load on a certain subsystem, and efficiently processes data with the plurality of subsystems operating in a loosely coupled manner, and can therefore handle a large geographic space encompassing one or more states, countries, continents, etc.

Figure 4:
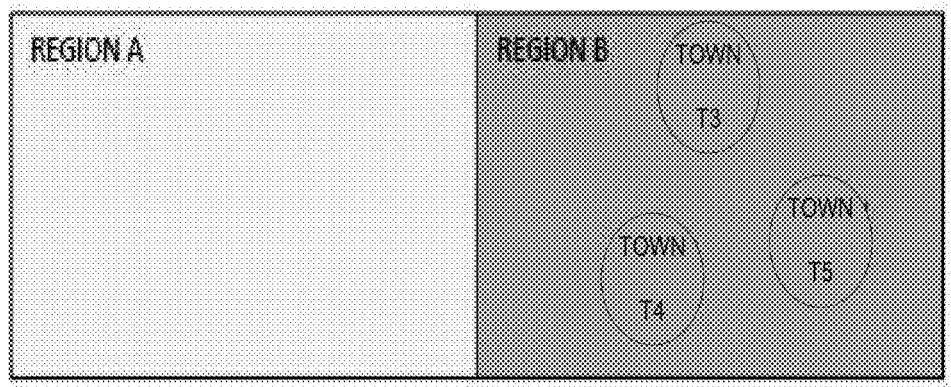
FIG. 4 shows an example of a map area divided by a dividing section, according to an embodiment of the present invention.

A first example in which the system balances the loads of two subsystems is described below using FIGS. 4 to 6. FIG. 4 shows an example of a map area divided by a dividing section, such as the dividing section 130, according to an embodiment of the present invention. FIG. 4 shows an example of the result of an operation of dividing a map area, such as S320 of FIG. 3. FIG. 4 shows an example in which the map area is divided into region A and region B. A first subsystem manages region A, and a second subsystem manages region B.

The first subsystem may manage the routes in region A, the events occurring in region A, and the moving objects moving on the routes in region A. The first subsystem may receive information of a moving object that has moved from region B to region A, from the second subsystem, and begin management of the moving object. The first subsystem may supply the second subsystem with information of a moving object that has moved from region A to region B, and transfer the management of the moving object. Region A includes a town T1 and a town T2, and region B includes a town T3, a town T4, and a town T5.

Figure 5:
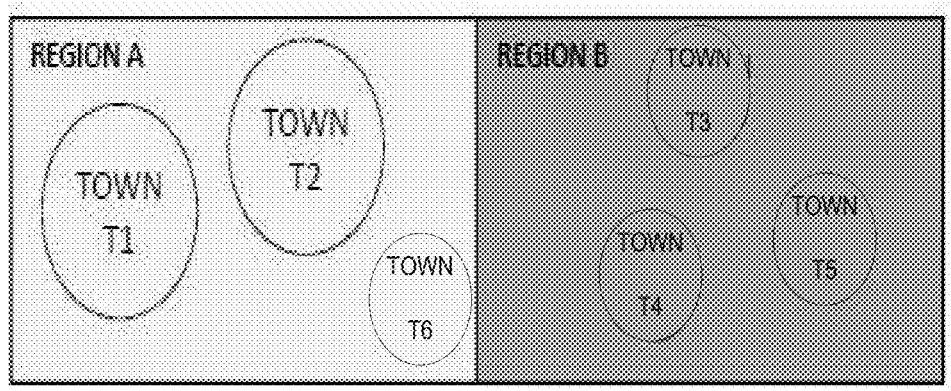
FIG. 5 shows an example of a case in which the load of one subsystem has increased, according to an embodiment of the present invention.
Figure 6:
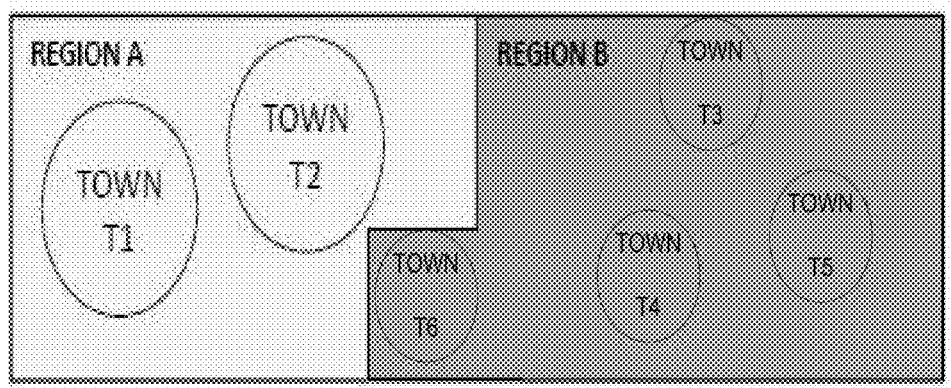
FIG. 6 shows an example of region boundaries changed by the region manager, according to an embodiment of the present invention.

FIG. 5 shows an example of an increased load of one subsystem, according to an embodiment of the present invention. City development has progressed in region A, and a town T6 has been formed. In this way, since a new town T6 has formed, the routes in region A and the number of moving objects moving in region A have increased. In such a case, the load of the first subsystem managing region A increases relative to the load of the second subsystem. If this happens, then the processing load on the first subsystem increases, and causes the load to exceed the processing capability of the first subsystem.

The system of the present embodiment may change the boundary of region A according to the load of the first subsystem. Specifically, a region manager, such as the region manager 140, may change the boundaries of region A and region B according to the monitoring results of the loads of the first and second subsystems from a monitoring section, such as the monitoring section 170. In this case, the region manager may instruct the first subsystem to change the boundary such that the partial region including the town T6 in region A is removed from region A, and may instruct the second subsystem to change the boundary such that the partial region including the town T6 in region A is added to region B.

According to the instructions from the region manager, the first subsystem may supply the second subsystem with information of the portion of region A including the town T6, and stop management of this region portion. According to the instructions from the region manager, the second subsystem may receive the information of the portion of region A including the town T6 from the first subsystem, and begin management of this portion. FIG. 6 shows an example of region boundaries changed by the region manager, according to an embodiment of the present invention. In this way, the system according to the present embodiment can prevent processing from overwhelming the first subsystem, and can prevent the load from exceeding the processing capability of the first subsystem.

Figure 7:
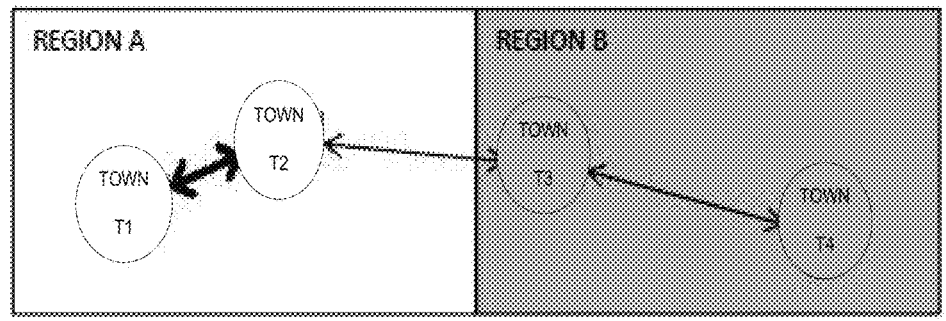
FIG. 7 shows an example of a map area that is divided by the dividing section, according to an embodiment of the present invention.

A second example in which the system adjusts the balance of loads between two subsystems is described below using FIGS. 7 to 9. FIG. 7 shows an example of a map area that is divided by a dividing section, such as the dividing section 130, according to an embodiment of the present invention. FIG. 7 shows an example of a result of an operation of dividing a map area, such as S320 of FIG. 3. FIG. 7 shows an example in which the map area is divided into region A and region B. A first subsystem manages region A, and a second subsystem manages region B.

The first subsystem may manage the routes in region A, the events occurring in region A, and the moving objects moving on the routes in region A. The first subsystem may receive information of a moving object that has moved from region B to region A, from the second subsystem, and begin management of the moving object. The first subsystem may supply the second subsystem with information of a moving object that has moved from region A to region B, and transfer the management of the moving object.

Region A includes a town T1 and a town T2, and region B includes a town T3 and a town T4. The traffic amount, which is the amount of moving objects, between the town T1 and the town T2 is greater than the traffic amount between the town T3 and the town T4. Furthermore, the traffic amount between the town T2 and the town T3 is approximately equal to the traffic amount of between the town T3 and the town T4.

Figure 8:
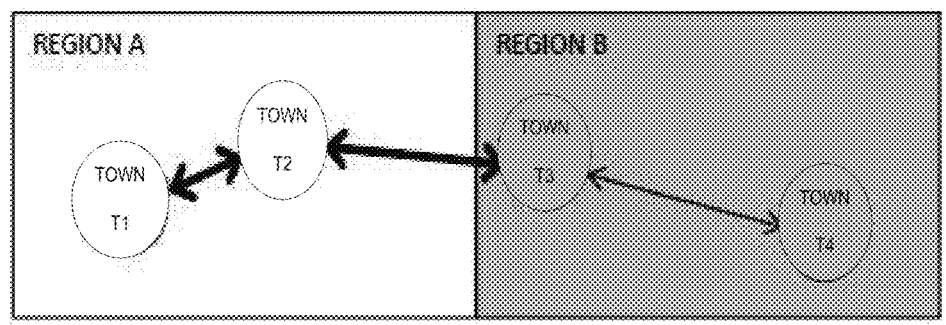
FIG. 8 shows an example of a case in which the loads of two subsystems have increased, according to an embodiment of the present invention.
Figure 9:
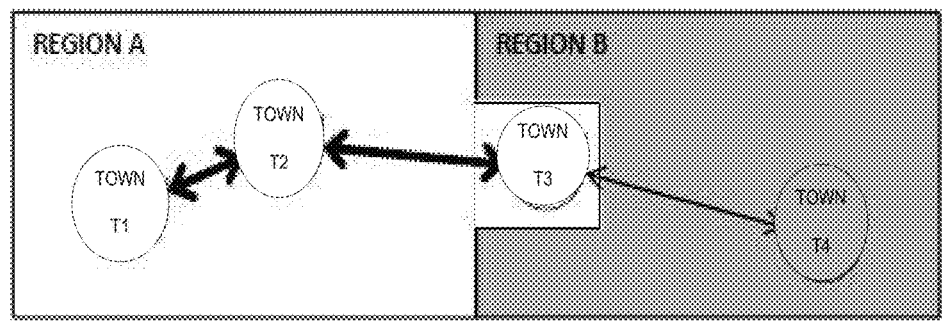
FIG. 9 shows an example of a boundary of a region changed by the region manager, according to an embodiment of the present invention.

FIG. 8 shows an example of a case in which the loads of two subsystems are increased, according to an embodiment of the present invention. FIG. 8 shows an example in which road development between the town T2 and the town T3 has progressed, and the traffic amount between the town T2 and the town T3 has increased relative to the traffic amount between the town T3 and the town T4.

In this embodiment, the traffic amount between region A and region B has increased, and therefore the amount of data exchanged between the first subsystem and the second subsystem has increased. The improvement of the road infrastructure and development of each town may have caused the processing to be increased on the first subsystem and/or the second subsystem, or cause the loads of the first subsystem and/or the second subsystem to exceed their processing capabilities.

If a boundary is positioned in a region in the midst of a route portion where the traffic amount exceeds a predetermined reference traffic amount in this manner, then the system may change the boundary of this region to include the entirety of this route portion in one of the adjacent regions. In this embodiment, a region manager, such as the region manager 140, may change the boundaries of region A and region B in response to the monitoring results of a monitoring section, such as the monitoring section 170, indicating that the traffic amount between the town T2 and the town T3 has exceeded the reference traffic amount. In this embodiment, the region manager may instruct the first subsystem to change the boundary such that the entire route between the town T2 and the town T3 is included as a new management target in region A, and may instruct the second subsystem to change the boundary such that the entire route between the town T2 and the town T3 is no longer included as a management target.

The ranges around the town T2 and the town T3 often include complex routes, and therefore the region manager may change the boundaries of the regions in a manner to avoid these ranges, or to minimize changes outside of the route between the town T2 and the town T3. The region manager may set the town T2, the town T3, and the route connecting the town T2 and the town T3 as management targets of the first subsystem (or the second subsystem).

In response to the instructions from the region manager, the second subsystem may supply the first subsystem with the information of the portion of region B including the town T3 and the route connecting the town T2 and the town T3, and may stop management of this region portion. In response to the instructions from the region manager, the first subsystem may receive from the second subsystem the information of this portion of region B, and may begin managing this region portion. In other embodiments, the second subsystem may continue to manage a transferred region portion until the first subsystem begins to manage the transferred region portion. This ensures that no portion is unmanaged at any time. FIG. 9 shows an example of a boundary of a region changed by a region manager, such as the region manager 140, according to an embodiment of the present invention. In this way, the system may prevent an increase in the amount of information exchanged among the plurality of subsystems.

The system may change the management target regions managed respectively by the subsystems, according to the respective loads of the subsystems. The system 100 may also divide or combine the management target regions according to the respective loads of the subsystems.

For example, if the load of a first subsystem is high, and the load of a second subsystem of an adjacent region to the region of the first subsystem cannot handle any more load, the region manager may divide the first subsystem into two. In this case, the region manager may cause the first subsystem to manage one of the regions resulting from the division, and transfer the management of the other region resulting from the division to a subsystem having no region allocated thereto.

If the loads of two subsystems of adjacent regions are low, and combining the management target regions of these two subsystems would result in a load that could be managed by a single subsystem, then the region manager may combine these two management target regions into one. In this case, the region manager may cause one of the two subsystems to manage the one management target region resulting from the combination, and may remove the region allocation from the other subsystem. In this way, the system may adjust the loads of the subsystems by dividing or combining the management target regions.

In the system, a dividing section, such as the dividing section 130, may divide the map area into a plurality of regions. The dividing section may divide the map area into a plurality of regions with designated shapes. The dividing section may divide the map area into regions with square or hexagonal shapes, for example, or into regions with a combination of a plurality of types of shapes. In embodiments where the dividing section divides the map area into regions with square or hexagonal shapes, for example, the boundaries of the regions may form a grid pattern or a honeycomb pattern.

If the map area is divided into shapes in this manner, then the system may further include a plurality of redundant regions with shapes that do not substantially match the shape of the regions resulting from the division. In this case, the dividing section may perform division while shifting the center or weighted center of each region relative to the center or weighted center of each redundant region, such that the regions and the redundant regions do not completely overlap. For example, if the map area is divided into a plurality of regions having a plurality of square shapes, then the dividing section may provide redundant regions that resemble these square shapes. The dividing section may provide the centers of these square redundant regions at positions matching the vertices of the square regions. The subsystems may respectively manage these redundant regions.

In this way, if a moving object moves near the vertex of a region or moves in a serpentine route near a vertex, even though the moving object moves between regions, the moving object is moving at a position near the center of the redundant region including this vertex. Accordingly, even though a moving object moves in a manner that would cause information to be exchanged a plurality of times between a plurality of subsystems, the system can decrease the number of information exchanges by using a subsystem to manage the redundant region.

The system dynamically changes the boundary of a region managed by a subsystem, according to the load of the subsystem. In the above description, as a result of changing the boundary, due to an increase of the management target region, the subsystem receives information of this increased region from the subsystem that has previously managed this region. In addition, each of the subsystems may manage at least a portion of the data processing relating to a moving object positioned within a range from the boundary with an adjacent management target region, in parallel with the subsystem that manages this adjacent region.

In this way, each subsystem manages a region that has been expanded in advance, and therefore if the boundary of a region is dynamically changed, then management of the transferred region portion can begin immediately without immediately exchanging information with another subsystem. Furthermore, after a boundary is changed and management of the transferred region portion has begun, the subsystem may receive information of the transferred region portion from another subsystem. In this way, the system can spread out the exchange of information among the subsystems over time, thereby preventing temporary increases in the processing of a subsystem.

Figure 10:
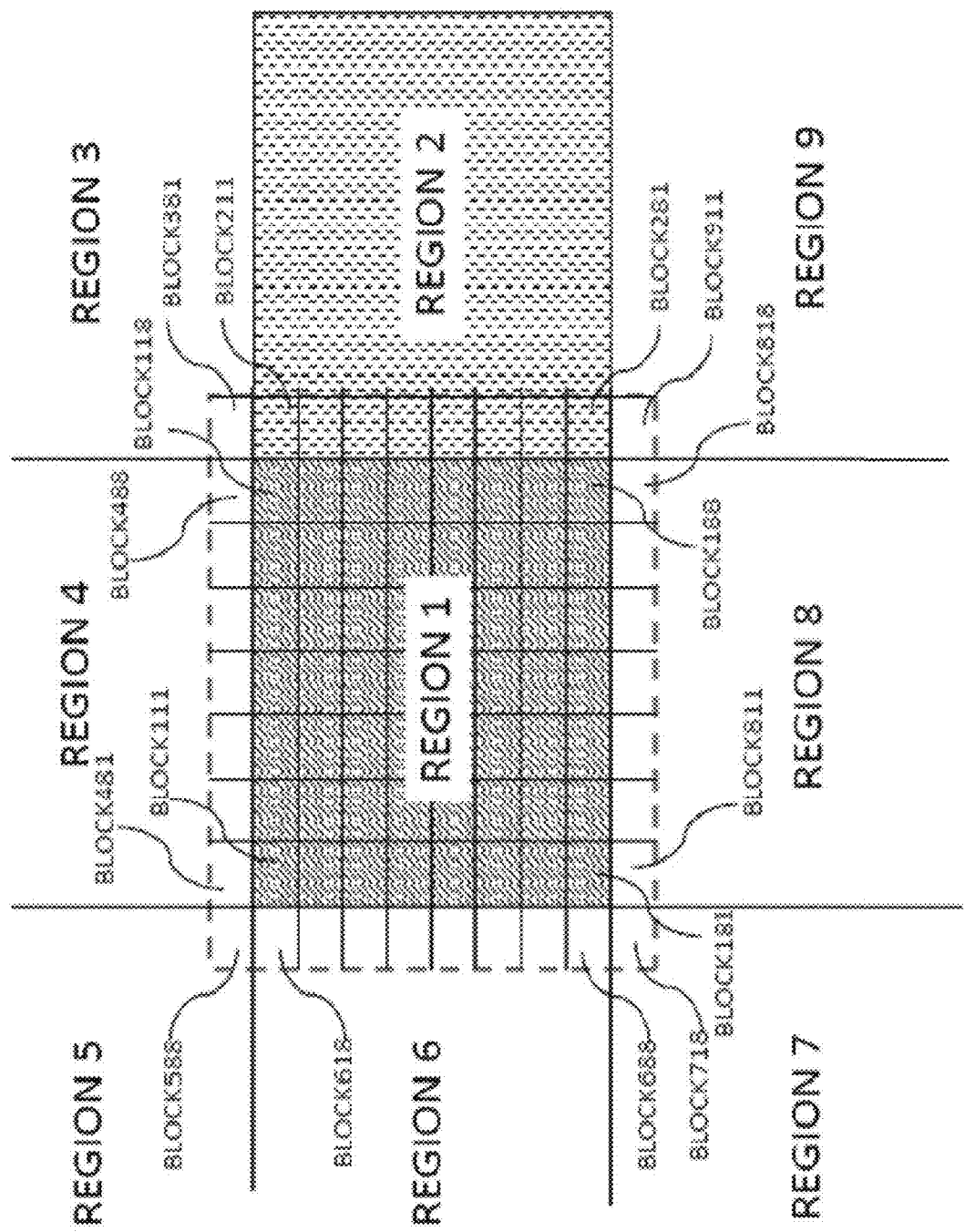
FIG. 10 shows an example of a map area divided by the dividing section, according to an embodiment of the present invention.

FIG. 10 shows an example of a map area divided by a dividing section, such as the dividing section 130, according to an embodiment of the present invention. FIG. 10 shows an example in which the dividing section divides the map area into region 1 to region 9. In the example described below, each of the subsystems is operable to divide a region into block units. FIG. 10 shows an example in which each of the subsystems respectively managing region 1 to region 9 has divided the region into 64 blocks in an 8×8 configuration, and manages each block.

At least one of the subsystems may be operable to manage adjacent route information for routes within each of the blocks included within a partial range in an adjacent region. For example, the subsystem 200 managing region 1 may expand its management region to include each block within a range in a region adjacent to region 1. FIG. 10 shows an example in which the subsystem that manages region 1 has expanded its managed region to include the region portion shown by the square shape formed by the dotted lines in the drawing. In other words, this subsystem may manage the management target region together with an adjacent management target region that includes block 211 to block 281 in the adjacent region 2. In the same manner, this subsystem may manage block 381 in region 3, block 481 to block 488 in region 4, block 588 in region 5, block 618 to block 688 in region 6, block 718 in region 7, block 811 to block 818 in region 8, and block 911 in region 9 as the adjacent management target region.

In this way, each subsystem divides the management target region into blocks for management, and each subsystem may manage a region expanded to include predetermined block units of a portion of the adjacent regions.

Figure 11:
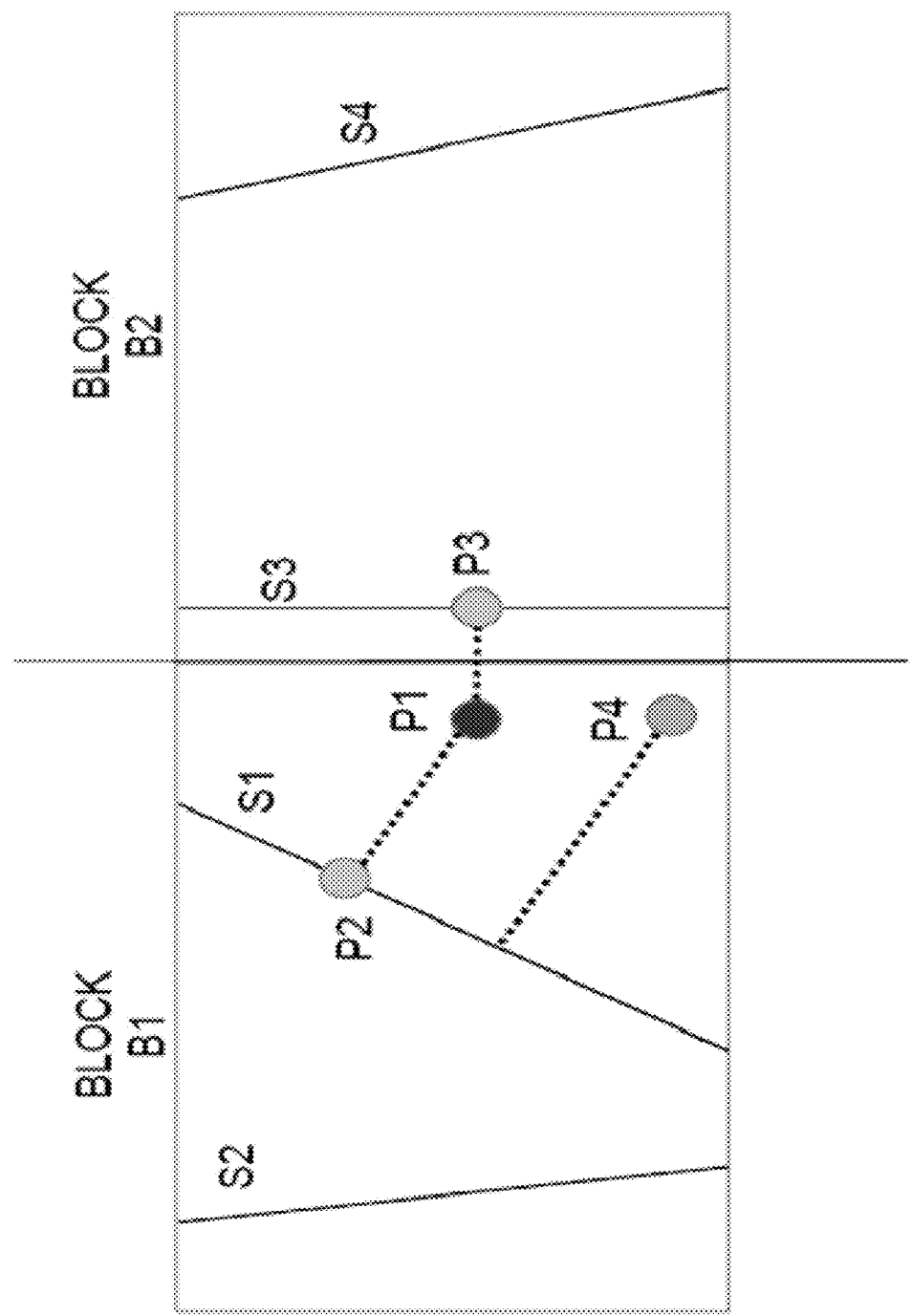
FIG. 11 shows a first example of blocks managed respectively by two subsystems, according to an embodiment of the present invention.

FIG. 11 shows a first example of blocks managed respectively by two subsystems, according to an embodiment of the present invention. FIG. 11 shows adjacent blocks B1 and B2 as an example of blocks managed respectively by two subsystems. Block B1 is a management target region of a first subsystem, e.g. within region 1, and block B2 is a management target region of a second subsystem, e.g. within region 2, and is an adjacent management target region of the first subsystem.

Block B1 includes route S1 and route S2 on which moving objects move, and block B2 includes route S3 and route S4. The subsystems manage such route information, information concerning the moving objects moving on these routes, information concerning events occurring on these routes, and the like. In block B2, which is the adjacent region, the moving object moving on the route near block B1 is possibly moving to the management target region of the first subsystem. For example, in response to route S3 turning toward block B1, the moving object positioned at position P3 on route S3 moves toward the management target region of the first subsystem.

Since the subsystems map the moving objects in the map area, the observation positions of the moving objects include observation errors, and therefore there are cases where an observation position within a certain block should instead be mapped to a route of a block adjacent to this certain block. For example, in response to the moving object moving at position P3 on route S3 transmitting the observation position as being position P1 in block B1, the region manager 140 may determine that the first subsystem managing block B1 is the subsystem to perform management.

If the first subsystem is not managing an adjacent region as an adjacent management target region, then the first subsystem may search for the position of the moving object within the block B1, which is the management target region, and map this position. In this case, there is a problem that the first subsystem maps the moving object at position P2 on route S1, which is closest to position P1, for example. If the moving object moving on route S3 transmits the following observation position as being position P4 in block B1, then there is a problem in that even though searching for the position of the moving object within block B1, the position is mapped on route S1 at a distance farther than the distance between position P1 and position P2.

However, the first subsystem includes the adjacent block B2 as the adjacent management target region, and therefore may search for the position of the moving object within block B1 and block B2, and map this position. In other words, the first subsystem can map the moving object at position P3 on route S3, which is the closest to position P1.

There are cases where the route information of a position distanced from the border of an adjacent block is almost entirely unused in the management by the subsystems. For example, route S4 in block B2 is distanced from the border, and there is route S3 closer to the border, and therefore any observation positions in block B1 cannot be closer to S4 than S3 in block B2.

Accordingly, the route information of a position distanced from the management target region may be omitted from the adjacent management target region. The subsystem may set the adjacent route information to be data that is expected to be used in searching for the position of a moving object with map matching in the adjacent management target information. The subsystem includes route S3, which can be selected as a position that is the shortest distance from at least one point on the boundary line between block B1 and block B2, in the route information. Furthermore, all of the points on route S3 are closer to the boundary line between block B1 and block B2 in comparison to route S4, and therefore the subsystem may exclude route S4, which cannot be selected as a position at the shortest distance from all points on this boundary line, from the route information.

Figure 12:
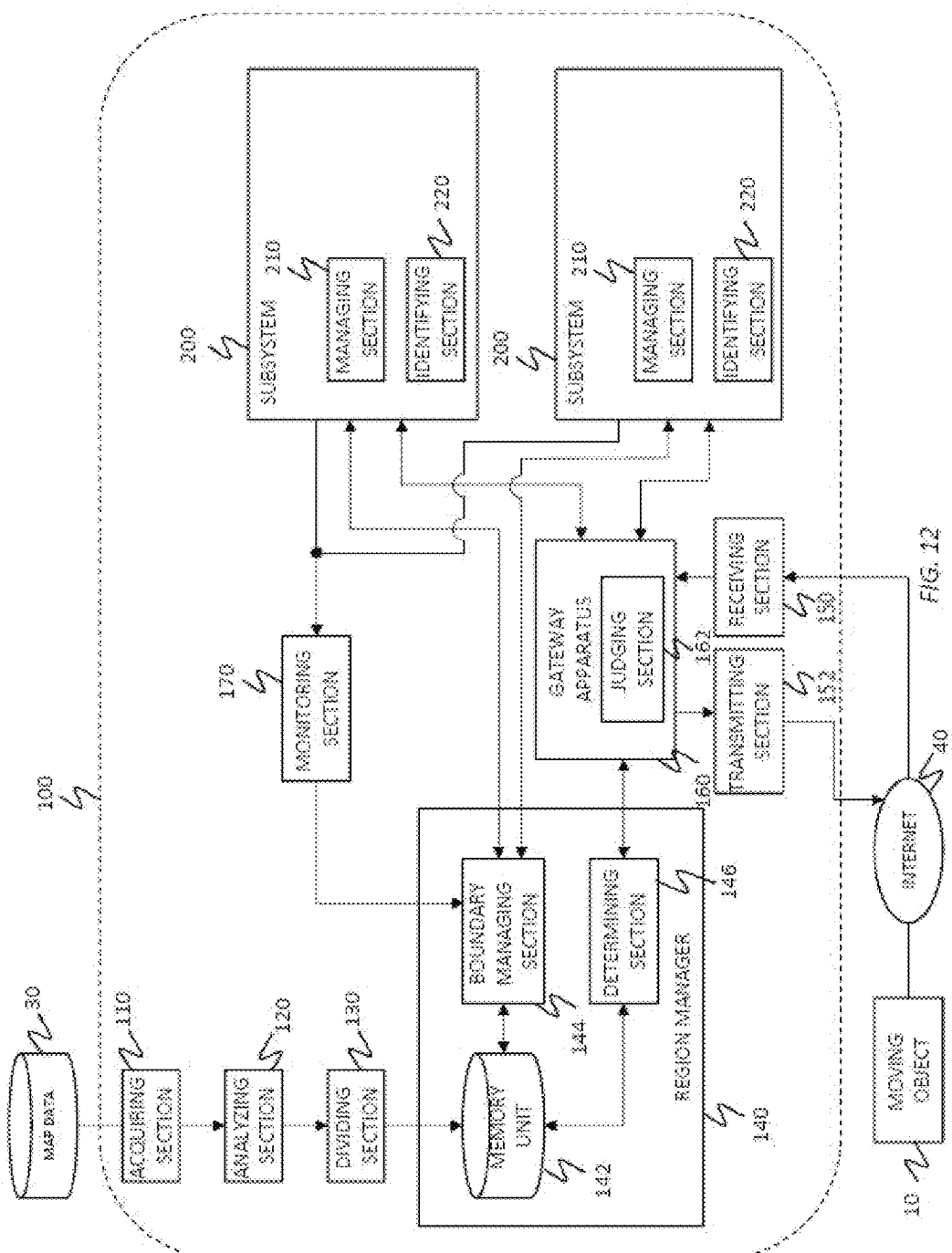
FIG. 12 shows an exemplary configuration of a system, according to an embodiment of the present invention.

The system may increase the map matching accuracy using the adjacent management target region, and may efficiently perform map matching using adjacent search data, as described using FIG. 12. FIG. 12 shows an exemplary configuration of a system 100, according to an embodiment of the present invention. The gateway apparatus 160 of the system 100 in this embodiment includes a judging section 162, and all components other than the judging section 162 may have substantially the same structure and function as the components in the system 100 in FIG. 2. The description of the system 100 in this embodiment omits the descriptions of all components other than the judging section 162, but the operation of the system 100 is not limited to the operation of the system 100 in FIG. 2.

In the system 100 of this embodiment, the managing section 210 and the identifying section 220 of at least one subsystem 200 among the plurality of subsystems 200 may operate in the following manner. The managing section 210 may manage the individual route information for routes within the management target region of the at least one subsystem 200 from among the plurality of regions, and may manage adjacent route information for routes in regions adjacent to the management target region. In other words, in addition to the individual route information, the managing section 210 may manage adjacent route information for all adjacent regions.

The managing section 210 may be operable to manage the individual route information and the adjacent route information for routes positioned within a predetermined partial range from the boundary of the management target region among the routes in the region adjacent to the management target region. Since the managing section 210 manages the management target region in block units, the managing section 210 may manage information concerning the routes within a plurality of blocks positioned within a range extending from the boundary of the management target region, from among the blocks within the adjacent region.

The managing section 210 may be operable to manage, as the adjacent route information, information concerning a portion of routes that are selected as having a shorter distance to a geographic point on the boundary of the target region, from among the plurality of routes positioned within a predetermined partial range in the adjacent region. For example, since the managing section 210 manages routes in a plurality of blocks adjacent to the management target region, the managing section 210 may manage information concerning the routes that can be selected as a route that is the shortest distance from at least one point on the boundary of the management target region, from among the routes in the blocks.

The managing section 210 may be operable to manage, as the adjacent route information, information concerning routes that excludes the routes that cannot have a lesser distance to a point on the boundary of the management region than any other route, among the plurality of routes positioned within a range in the adjacent region. For example, if the managing section 210 manages the routes in a plurality of blocks adjacent to the boundary of the management target region, then the managing section 210 may exclude information concerning routes that cannot be selected as a position that is the shortest distance from all points on the boundary of the management target region among the routes in the block, from the adjacent route information.

The managing section 210 may be operable to manage the adjacent route information obtained by selecting a route, from among the plurality of routes positioned in a predetermined partial range in the adjacent region, having a distance to a point on the boundary of the management target region is not greater than the distance of any route in the management target region. In this case, the managing section 210 may exclude, from the adjacent route information, any route from among the plurality of routes positioned in the predetermined partial range in the adjacent region having a distance to a point on the boundary of the management target region greater than any route within the management target region.

The identifying section 220 may be operable to identify a route on which a moving object 10 is positioned based on the observation position, using the individual route information and the adjacent route information managed by the managing section 210 of at least one subsystem 200. The identifying section 220 may perform map matching by searching for a position on a route corresponding to the observation position received from the moving object 10, from among the plurality of routes included in the individual route information and the adjacent route information.

In this way, even if the position information supplied from a moving object 10 is in a region outside of the management target region, as long as there is position information of a region managed as the adjacent route information, the subsystem 200 that manages the adjacent route information may manage the management target region in the same manner. As a result, even when there is an error in the position information supplied from the moving object 10 and the actual position of the moving object 10 is in a region outside of the management target region, the subsystem 200 managing the management target region can perform map matching using the adjacent route information, without transferring the management to the subsystem managing the adjacent region.

The gateway apparatus 160 according to the present invention may include a judging section 162. The judging section 162 may be operable to determine the route taken by a moving object 10 that is moving near the boundary of a region, based on the results of the map matching performed by the subsystem 200.

Figure 13:
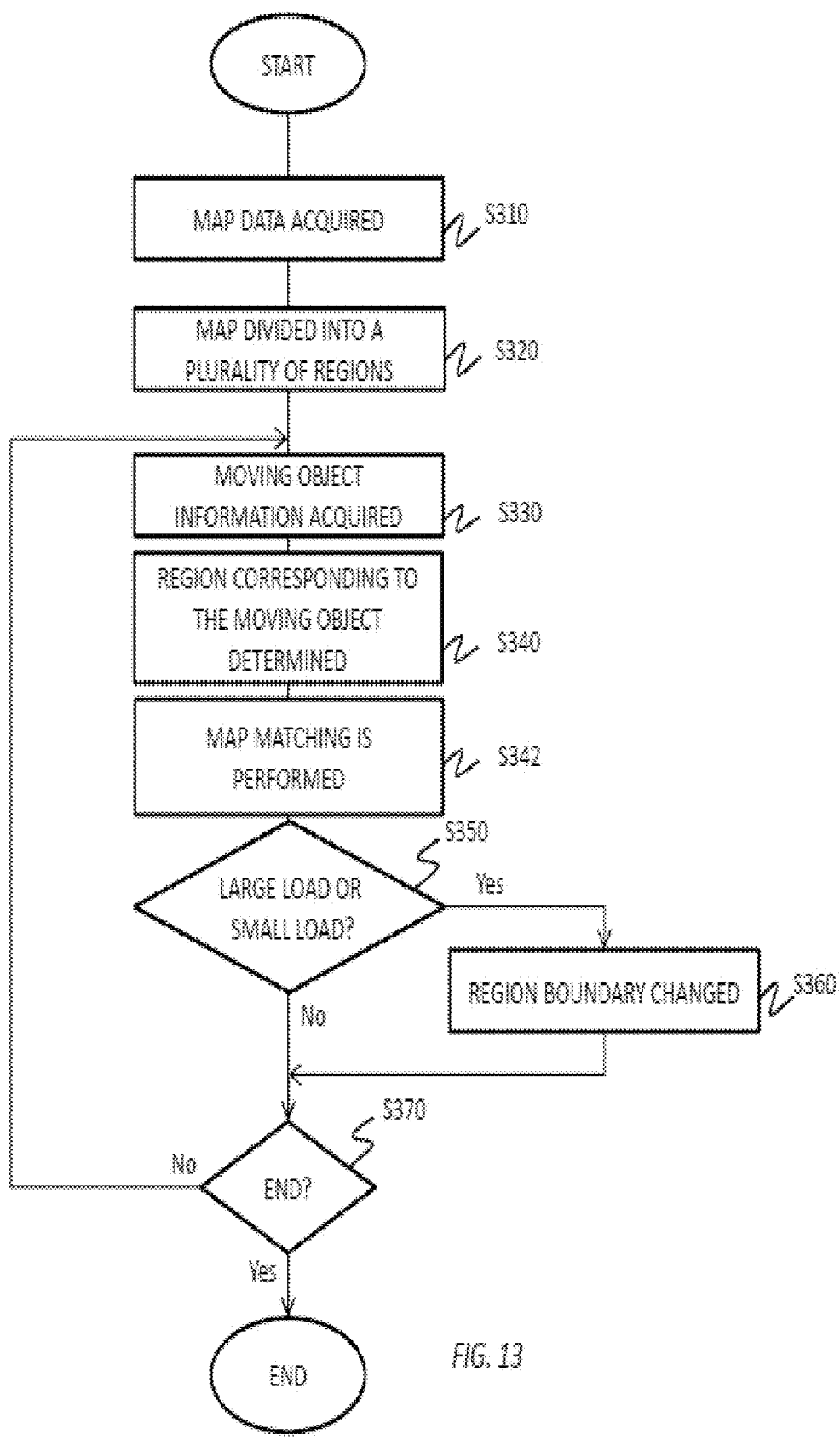
FIG. 13 shows an operational flow of a system, according to an embodiment of the present invention.

FIG. 13 shows an operational flow of a system, according to an embodiment of the present invention. The present embodiment describes an example in which a system, such as the system 100 of FIG. 12, performs the operations from S310 to S370, which are substantially similar to the operations shown in FIG. 3, to increase the accuracy of the map matching while dynamically adjusting the balance of the loads among a plurality of subsystems. FIG. 13 shows one example of the operational flow of the system 100 shown in FIG. 12, but the system 100 shown in FIG. 12 is not limited to using this operational flow. Moreover, the operational flow of FIG. 13 may be performed by other systems. Furthermore, the operational flow of the system shown in FIG. 13 omits descriptions based on operations described in FIG. 3, and is not limited to the operational flow shown in FIG. 3.

An acquiring section, such as the acquiring section 110, may acquire the map data of the geographic space to be managed by the system (S310). Next, an analyzing section, such as the analyzing section 120, analyzes the acquired map area, and a dividing section, such as the dividing section 130, may divide the map area according to this analysis (S320). Next, a receiving section, such as the receiving section 150, may receive the information transmitted from each of a plurality of moving objects (S330). After this, in response to the request from a gateway apparatus, such as the gateway apparatus 160, a region manager, such as the region manager 140, may determine the regions in which the moving objects are positioned, based on the position information received from each of the moving objects, and may determine the subsystem for managing the maps of these regions from among the plurality of subsystems (S340). The gateway apparatus 160 may transfer each piece of received information, with the subsystem corresponding to the position information as determined by the region manager 140 serving as the transfer destination. The operations described above may be performed in the same manner as the operations described in FIG. 3, and therefore further description is omitted.

The subsystems may respectively map (perform map matching for) the pieces of received information on a map of the management target regions (S342). Specifically, the identifying section may perform map matching by searching for position on routes corresponding to the transferred position information, from among the plurality of routes included in the individual route information and the adjacent route information. By using the adjacent route information in addition to the individual route information, the identifying section 220 can reduce the occurrence of map matching on a route differing from the route on which the moving object is positioned and transferring management to the subsystem managing the adjacent region.

The region manager may determine whether or not the load placed on each subsystem is large (or small) (S350). If the load of one or more of the subsystems is determined to be large or small (S350: Yes), the region manager may change the boundary of the region managed by the subsystem whose load was determined to be large or small (S360). If instructions for suspending or stopping the operation have not been received, then the system may return to the operation of S330 for receiving information from the moving objects and continue managing the subsystems. The operations of S350 to S370 described above may be performed in substantially the same manner as the operations described in FIG. 3, and therefore further description is omitted.

In the foregoing embodiment, in the system, each subsystem performs map matching based on information including the adjacent route information added to the individual route information of the management target region, and therefore it is possible to improve the accuracy of this map matching. Furthermore, the system dynamically changes the boundary managed by each subsystem according to the respective loads of the subsystems, and can therefore adjust the balance of the loads among the subsystems according to dynamic changes in the events and moving objects.

Figure 14:
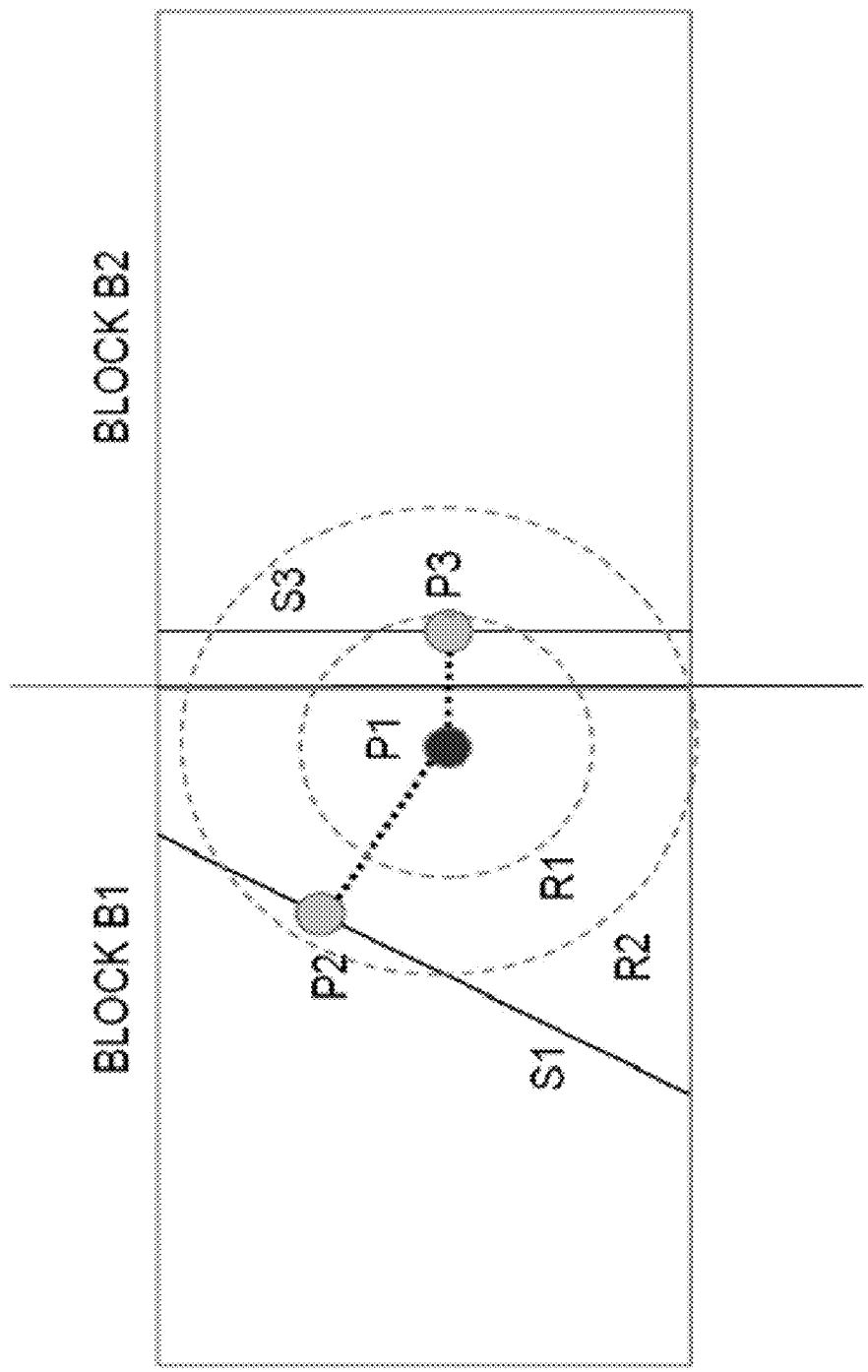
FIG. 14 shows a second example of blocks managed respectively by two subsystems, according to an embodiment of the present invention.

A first example in which the system according to the present embodiment described above improves the accuracy of the map matching is described below using FIG. 14. FIG. 14 shows a second example of blocks managed respectively by two subsystems, according to an embodiment of the present invention. FIG. 14 shows adjacent blocks B1 and B2 as an example of blocks managed by two subsystems. Block B1 is part of the management target region of a first subsystem, e.g. region 1, and is adjacent the management target region of a second subsystem. Block B2 is part of the management target region of the second subsystem, e.g. region 2, and is adjacent the management target region of the first subsystem.

Block B1 includes route S1 on which a moving object moves, and block B2 includes route S3. The first subsystem, whose management target region includes block B1, may manage information concerning a route in block B2, which is adjacent the boundary of the management target region, which in this embodiment is the boundary between block B1 and block B2, as the adjacent route information. In other words, the first subsystem may manage information concerning the routes in block B2, which includes route S3. The first subsystem may manage, as the adjacent route information, information concerning route S3 that can be selected as a route that is the shortest distance from at least one point on the boundary of the management target region, among the routes in block B2.

In the same manner, the second subsystem, whose management target region is block B2, may manage information concerning the routes in block B1, which is adjacent the boundary of the management target region. In other words, the second subsystem may manage, as the adjacent route information, information concerning routes in block B1, which includes route S1. The second subsystem may manage, as the adjacent route information, information concerning route S1 that can be selected as a route that is the shortest distance from at least one point on the boundary of the management target region, from among the routes in block B1.

In response to a moving object transmitting the position P1 as the position information, a region manager, such as the region manager 140, may determine the first subsystem, having a management target region including block B1, to be the subsystem to manage this moving object. A gateway apparatus, such as the gateway apparatus 160, may transfer this position information to the first subsystem, according to the determination result of the region manager 140.

The first subsystem may search for the shortest route, among routes having lengths from position P1 to vertical lines passing through each route or to the nearest end point, among the routes managed in the individual route information and the adjacent route information. FIG. 14 shows an example in which the first subsystem searches route S3, for which the length from position P1 to a vertical line passing through another route is shortest, and finds the position P3 on route S3 as the position of the moving object.

In this case, the subsystem may search the individual route information and then search the adjacent route information. In other words, an identifying section, such as the identifying section 220, in one of the subsystems may be operable to use the individual route information to identify a first route candidate for a route on which the moving object is positioned in the management target region. The first subsystem may identify the first route candidate to be route S1, which is closest to position information P1 of the moving object, from the individual route information in block B1 serving as the management target region.

The identifying section may be operable to identify a second route candidate for a route on which the moving object is positioned in the adjacent region, using the adjacent route information, on the condition that the position information indicates a position closer to the boundary of the management target region than the route of the first route candidate. Since position information P1 is closer to the boundary of the management target region than route S1, the first subsystem may identify the second route candidate to be route S3, which is closest to position information P1 in the adjacent route information.

The identifying section may be operable to identify the route on which the moving object is positioned while prioritizing the route of the second route candidate over the route of the first route candidate, in response to the observation position being closer to the route of the second route candidate than to the route of the first route candidate. The first subsystem may identify the route on which the moving object is positioned while prioritizing route S1 of the second route candidate over route S3 of the first route candidate, in response to the observation position P1 being closer to route S3 of the second route candidate than to route S1 of the first route candidate.

In this way, since at least one subsystem searches for a route corresponding to the position information of a boundary of the management target region among the individual route information and the adjacent route information, the system can improve the map matching. In this embodiment, at least one subsystem may select a plurality of route candidates. In other words, the identifying section in at least one of the subsystems may be operable to identify a plurality of route candidates on which the moving object could be located based on the observation position, by using the individual route information and the adjacent route information managed by this subsystem. In this case, the at least one subsystem may identify a threshold number of route candidates in order, beginning with the route closest to the position information.

The identifying section in at least one subsystem may be operable to identify, as a plurality of candidates for routes on which the moving object is positioned, routes within a predetermined threshold error range from the observation position, by using the individual route information and the adjacent route information managed by the at least one subsystem. In response to an error R1 contained in the observation position at which the moving object is observed, at least one subsystem may determine that the moving object could be positioned within a circle with a radius R1 centered on the position information P1. Since only route S3 is included in this region, the first subsystem may determine that the moving object is positioned on route S3.

In response to an error R2 contained in the observation position at which the moving object is observed, at least one subsystem may determine that the moving object could be positioned within a circle with a radius R2 centered on the position information P1. Since both route S1 and route S3 are included in this region, the first subsystem may determine route S1 and route S3 to be the route candidates. An example of subsystems identifying a plurality of routes in this manner is described below using FIG. 15.

Figure 15:
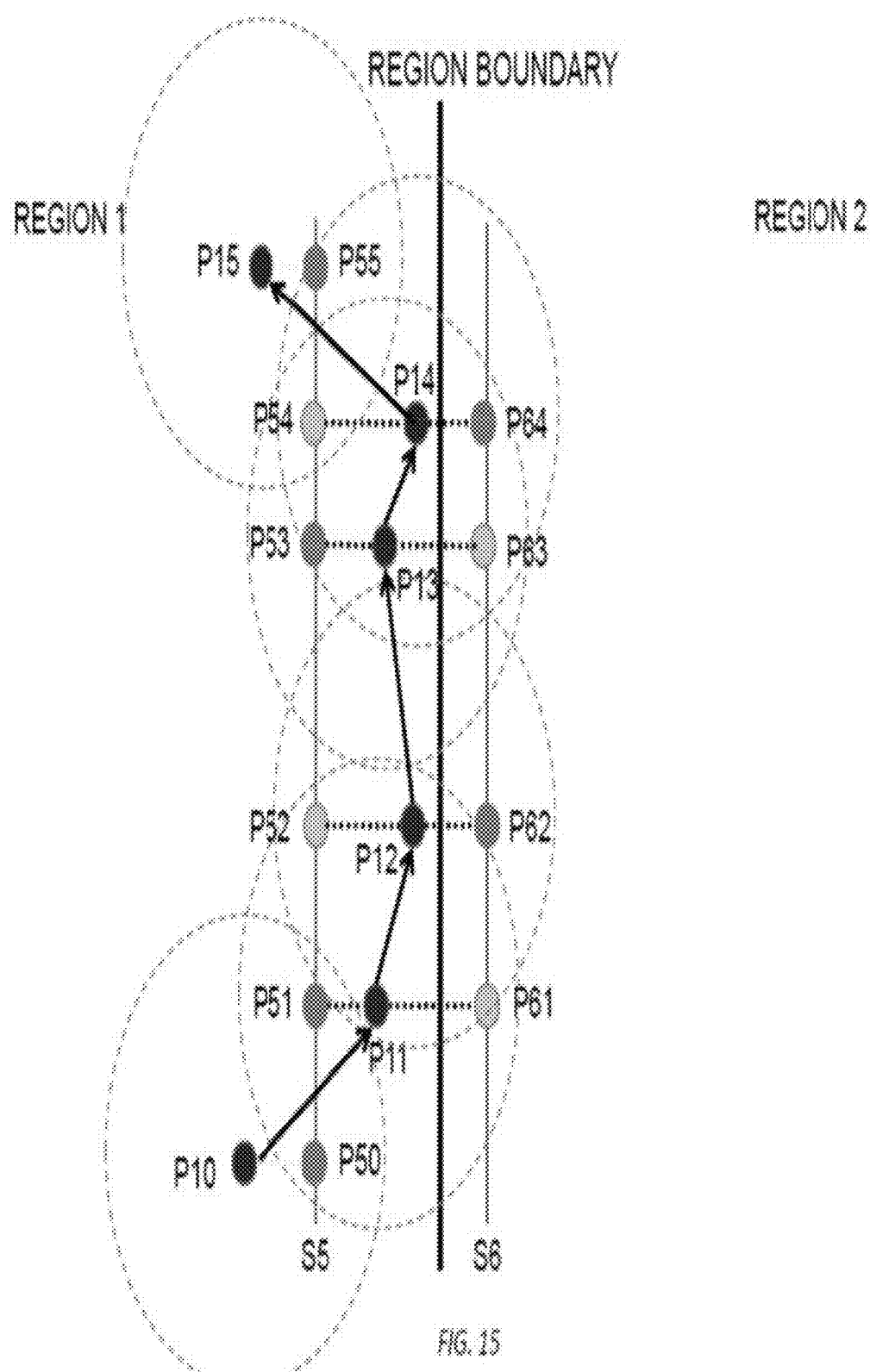
FIG. 15 shows an example in which subsystems identify a plurality of routes as route candidates, according to an embodiment of the present invention.

FIG. 15 shows an example in which subsystems identify a plurality of routes as route candidates, according to an embodiment of the present invention. FIG. 15 shows an example in which a first subsystem managing region 1 manages route S6 in a region near the boundary with region 2 as the adjacent route information, and a second subsystem managing region 2 manages route S5 in a region near the boundary with region 1 as the adjacent route information. FIG. 15 shows an example in which route S5 in region 1 and route S6 in region 2 are near the boundary between region 1 and region 2, and a moving object is moving on either route S5 or route S6.

The moving object may transmit pieces of position information P10 to P15 in time sequence, and since each position is near the boundary between region 1 and region 2, a gateway apparatus, such as the gateway apparatus 160, may transfer this position information to the first subsystem. Here, the observation error in the position information of the moving object is represented by a dotted circle centered on each piece of position information. The first subsystem may identify the routes that are within a range of this observation error, determine that the position corresponding to position information P10 is position P50 on route S5, and determine that the position corresponding to position information P15 is position P55 on route S5.

According to the presence of a plurality of routes within the range of the observation error, the first subsystem may identify routes S5 and S6 as the route candidates for the position information P11, and in the same manner may identify routes S5 and S6 as route candidates for the position information P12 to P14. Since the moving object can move on a route but cannot move between routes that are not connected, if routes S5 and S6 run parallel to each other without intersecting, then the moving object continues moving on only one of these routes.

The identifying section may be operable to select, from a plurality of routes identified as candidate routes, a route on which the moving object is most likely positioned while prioritizing routes that the moving object was determined to have been positioned on in the past. In other words, in response to routes S5 and S6 being identified as route candidates for the pieces of position information P11 to P14, the identifying section may select route S5 to be the route on which the moving object is most likely moving in response to determining that a corresponding position of the moving object transmitted in the past has been determined to be position P50 on route S5. For example, if the moving object travels along S5 every day, then the identifying section will acknowledge that there is a stronger likelihood that the moving object is on route S5 at this time.

In this way, the identifying section may map the moving object at positions corresponding to the positions P51, P52, P53, and P54 on route S5 for the pieces of position information P11 to P14. In the above description, the identifying section 220 identifies a route for the position information, but instead, the judging section 162 may determine a route corresponding to the position information of the moving object based on the results of the map matching performed by the subsystem. In other words, the identifying section 220 may identify position candidates and positions for the position information, and transmit the identification results to the gateway apparatus 160.

The judging section 162 may receive position P50 for the position information P10, position candidates P51 to P54 and P61 to P64 for the pieces of position information P11 to P14, and P55 for the position information P15. Since the position for the position information P10 is one point on route S5, the judging section 162 may determine that the route on which the moving object is moving is route S5, and may determine that the position corresponding to the pieces of position information P10 to P15 are position P50 to P55. Since the position corresponding to the position information P15 is position P55 on route S5, the judging section 162 may determine that the moving object is moving on route S5. The judging section 162 may notify the moving object about the determination results. If the plurality of routes cannot be narrowed to a single route despite the subsystem searching for a corresponding route using the individual route information and the adjacent route information, then the system can accurately select one of the routes among the plurality of identified candidates.

In the manner described above, the system can improve the map matching accuracy and prevent a decrease in the overall efficiency of the system. The present embodiment describes an example in which at least one of the subsystems may perform management by dividing the management target region into a plurality of blocks. In this case, the at least one subsystem may change the boundary of the region in block units and transfer management of block units. In this way, the management region of this subsystem may have a shape of the region therein changed in block units, and the adjacent management target region may be also be changed in block units along with this change.

Figure 16:
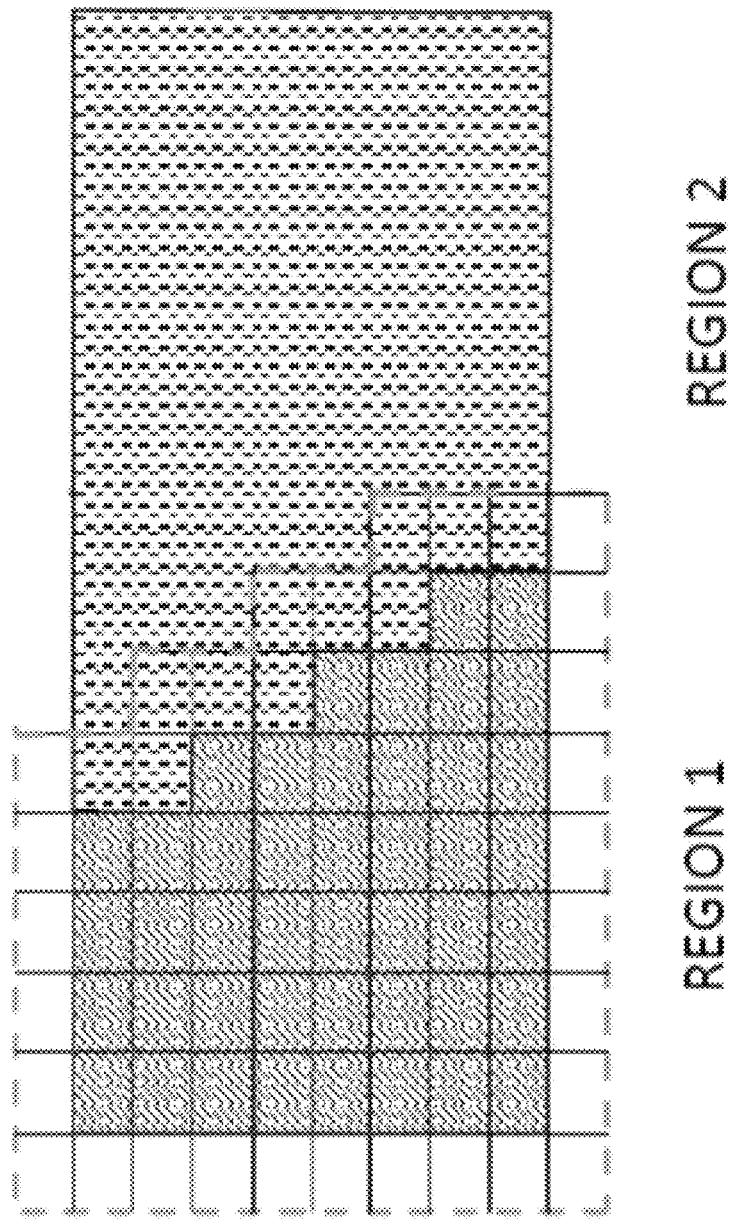
FIG. 16 shows an example in which subsystems manage the management target regions in block units, according to an embodiment of the present invention.

FIG. 16 shows an example in which subsystems manage the management target regions in block units, according to an embodiment of the present invention. FIG. 16 shows an example in which region 1 shaded by diagonal lines is the management target region of a first subsystem. In this way, the subsystem may manage the management target region in block units, and may also manage the adjacent management target region in block units as shown by the region indicated by the dotted lines in the drawing, for example.

Figure 17:
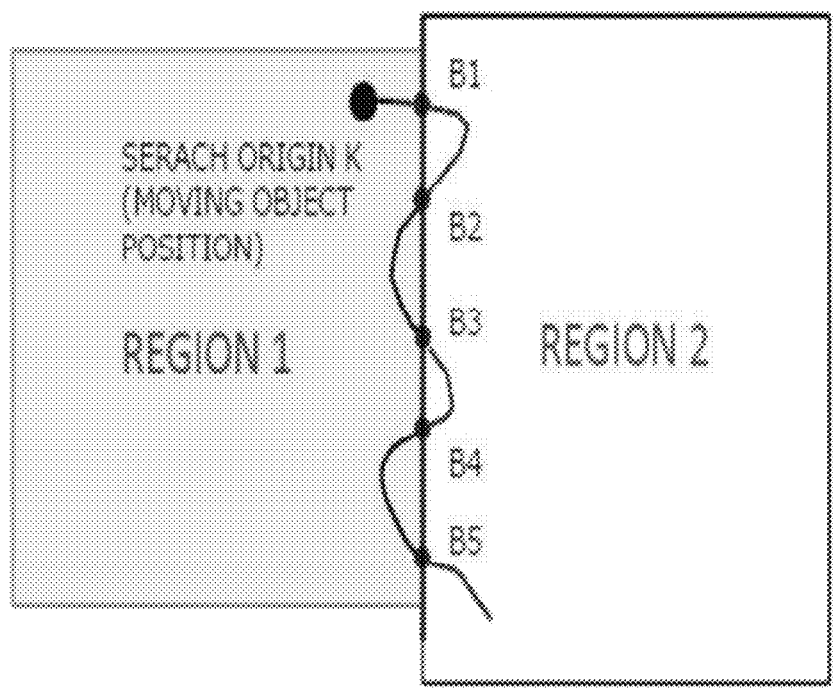
FIG. 17 shows a first example of a route moving back and forth between two regions managed by two subsystems, according to an embodiment of the present invention.

In the system, if an actual route moves in a serpentine manner between a plurality of regions, the amount of information exchanged between the subsystems increases in response to searching for events occurring in the direction in which a moving object is moving on this route. FIG. 17 shows a first example of a route moving back and forth between two regions managed by two subsystems. FIG. 17 shows an example in which region 1 managed by the first subsystem is adjacent to region 2 managed by the second subsystem. FIG. 17 shows an example in which the boundary between the two regions crosses the route at a plurality of intersection locations. The plurality of intersection locations are shown by intersection locations B1 to B5.

For example, in response to the moving object moving to position K, the first subsystem may search for the occurrence of an event with position K as the origin of the search. In this case, the first subsystem may perform the search in a range that includes the route from position K, which is in the management target region, to intersection location B1. In a range that includes the route from intersection B1 to intersection location B2, the first subsystem may transfer management to the second subsystem and, the second subsystem to which the management has been transferred may search for the occurrence of an event with intersection location B1 as the origin of the search, and may perform the search in a range including the route from intersection location B1, which is in the management target region, to intersection location B2.

Accordingly, every time the route on which the moving object moves is a geographical point intersecting the boundary between regions such as shown by intersection locations B1 to B5, management transfer occurs between the two subsystems and the event search is again performed in the town, which causes the amount of data exchanged between the subsystems to increase and causes the load of a certain subsystem to increase, thereby lowering the efficiency of the overall system. Therefore, the subsystems may hold information concerning a range from the region boundary in which it is possible to perform an event search in advance, thereby reducing the number of repeated event searches and the exchange of data between the subsystems.

Figure 18:
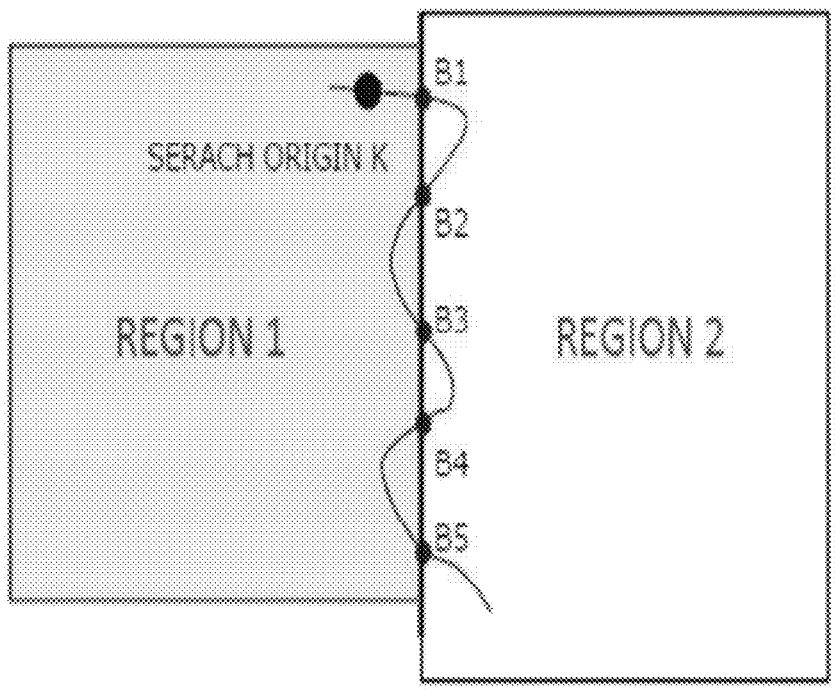
FIG. 18 shows a second example of a route that runs back and forth between two regions managed by two subsystems, according to an embodiment of the present invention.

FIG. 18 shows a second example of a route that runs back and forth between two regions managed by two subsystems, according to an embodiment of the present invention. In the same manner as in FIG. 17, FIG. 18 shows an example in which region 1 managed by the first subsystem is adjacent to region 2 managed by the second subsystem, and the border between the two regions crosses the route at intersection locations B1 to B5. The first subsystem may hold event information of region 1 and event information of a region including this route in region 2. In this way, the first subsystem can search for an event occurring in a range that includes this route at position K before the moving object moves beyond intersection location B1 from region 1 to region 2. In other words, the subsystem according to the present embodiment can decrease the number of repetitions of the event search and the amount of data exchanged between subsystems and set the origin of the search for this route to be position K of the moving object prior to moving on the portion of the route crossing between regions.

Figure 19:
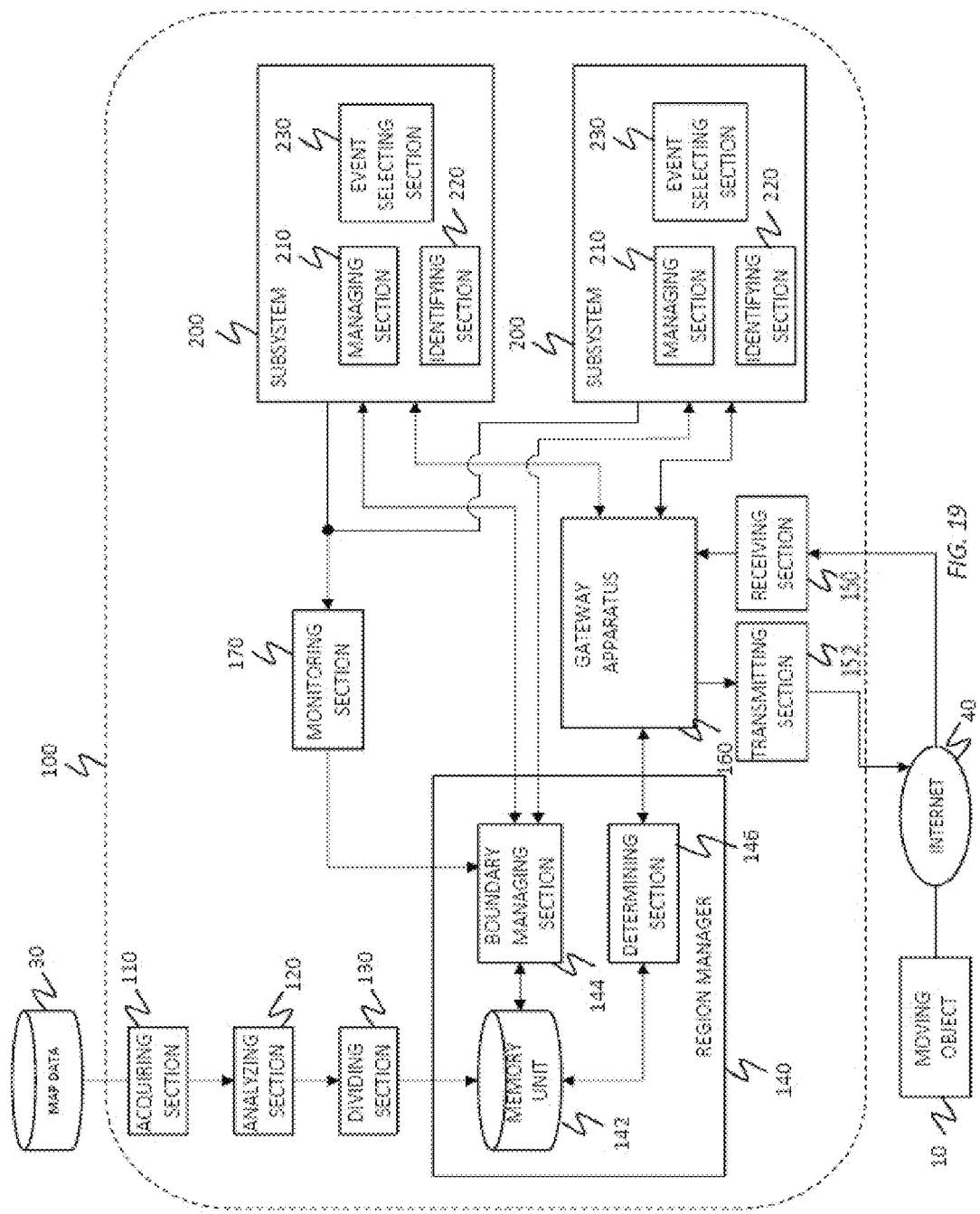
FIG. 19 shows an exemplary configuration of a system, according to an embodiment of the present invention.

FIG. 19 shows an exemplary configuration of the system 100, according to an embodiment of the present invention. In the system 100 in this embodiment, the subsystem 200 includes an event selecting section 230. All components other than the event selecting section 230 may have substantially the same operation as the components in the system 100 in FIGS. 2 and 12. Therefore, the description of the system 100 in this embodiment omits the descriptions of all components other than the event selecting section 230. The operation of the system 100 in this embodiment is not limited to the operation of the system 100 in FIGS. 2 and 12. Also, other system may be capable of the operations of the system 100 in this embodiment.

In the system 100 in this embodiment, the managing section 210 of at least one subsystem 200 among the plurality of subsystems 200 operates in the following manner. The managing section 210 may be operable to manage individual event information for events occurring within the management target region of the at least one subsystem 200 among the plurality of regions, and adjacent event information for events occurring in a predetermined partial range from the boundary of the management target region among the regions adjacent to the management target region. In other words, the managing section 210 may manage adjacent event information for a portion of an adjacent region in addition to the individual event information. Specifically, in searching for an event occurring in each route, the managing section 210 may search both the individual event information and the adjacent event information.

The managing section 210 may be operable to manage the adjacent event information by selecting events while giving priority to events occurring within a range from the boundary of the management target region. For example, the managing section 210 may select events while prioritizing events occurring within a distance range from the boundary of the management target region in a direction away from the management target region, and manage these events as the adjacent event information.

The managing section 210 may be operable to manage the adjacent event information by selecting events while prioritizing events occurring in a predetermined partial range from each intersection location where the boundary of the management target region intersects with a route. In other words, the managing section 210 may hold information concerning events that occur within a prescribed range from a route crossing point, i.e. an intersection location, where the route is crossed by a boundary, in addition to the individual event information.

In this case, the managing section 210 may be operable to calculate, for each intersection location, the range in which a moving object 10 that has passed the intersection point travels within a threshold time, based on history of movement of a plurality of moving objects 10, and to perform management in this range. For example, the managing section 210 may store the history of a plurality of moving objects 10 and acquire an average movement speed and a maximum movement speed at which the moving objects 10 move on each route, to determine the range.

The managing section 210 may be operable to manage the adjacent event information by selecting events while prioritizing events occurring within a range that is no greater than a threshold search distance from each intersection location. In other words, the managing section 210 may hold information concerning events occurring within a prescribed search distance from a route crossing point where the route is crossed by the boundary, in addition to the individual event information. For example, the managing section 210 may hold information concerning events occurring within a range that is the maximum search distance that can be covered by a single search.

The managing section 210 may be operable to manage the adjacent event information by selecting events while prioritizing events occurring in a range that can be reached by a moving object 10 from each intersection location within a threshold time. In other words, the managing section 210 may hold information concerning events in a range that can be reached in a predetermined threshold time from a route crossing point at which the route is crossed by the boundary, in addition to the individual event information. The managing section 210 may determine the range that can be reached by a moving object 10 within the predetermined threshold time based on information concerning the speed limit of the route, the maximum speed of the moving object 10, and the like.

The managing section 210 may be operable to change the range of events to be prioritized for selection in correspondence with the intersection locations, based on a characteristic of the route crossing the management target region at the intersection location. In other words, the managing section 210 may change the range of the adjacent region over which the adjacent event information is to be managed according to a characteristic of the route.

In this case, the managing section 210 may be operable to change the range over which the events are to be selected with priority in association with the intersection locations, based on at least one characteristic including the speed limit, the average speed, and the traffic state of the route crossing the management target region at each of the intersection locations. For example, if one route is a freeway with a speed limit of 100 km/h, a moving object 10 may move faster on this route than on other routes, and therefore the managing section 210 may hold information concerning events in a range that can be reached by a moving object 10 on this route in a predetermined threshold time. If there is a traffic jam on this freeway route or a reduced speed limit due to bad weather, a moving object 10 is expected to move at approximately the same speed on this route as on other routes, and the managing section 210 may hold information concerning events occurring in a designated search distance of a designated range for this route. In this way, the managing section 210 may change the held event information according to a characteristic reflecting the state of a route.

The event selecting section 230 may be operable to select events about which the moving object 10 is to be notified, from the adjacent event information and the individual event information managed by at least one subsystem 200. The event selecting section 230 may select, as an event about which the moving object 10 is to be notified, a held event obtained by searching the route on which the moving object 10 moves, from among the held events obtained by each managing section 210 searching the adjacent event information and the individual event information for each route. At least one subsystem 200 may notify a moving object 10 about an event, according to the selection results of the event selecting section 230. The operation of the system 100 described above is described below using FIG. 20.

Figure 20:
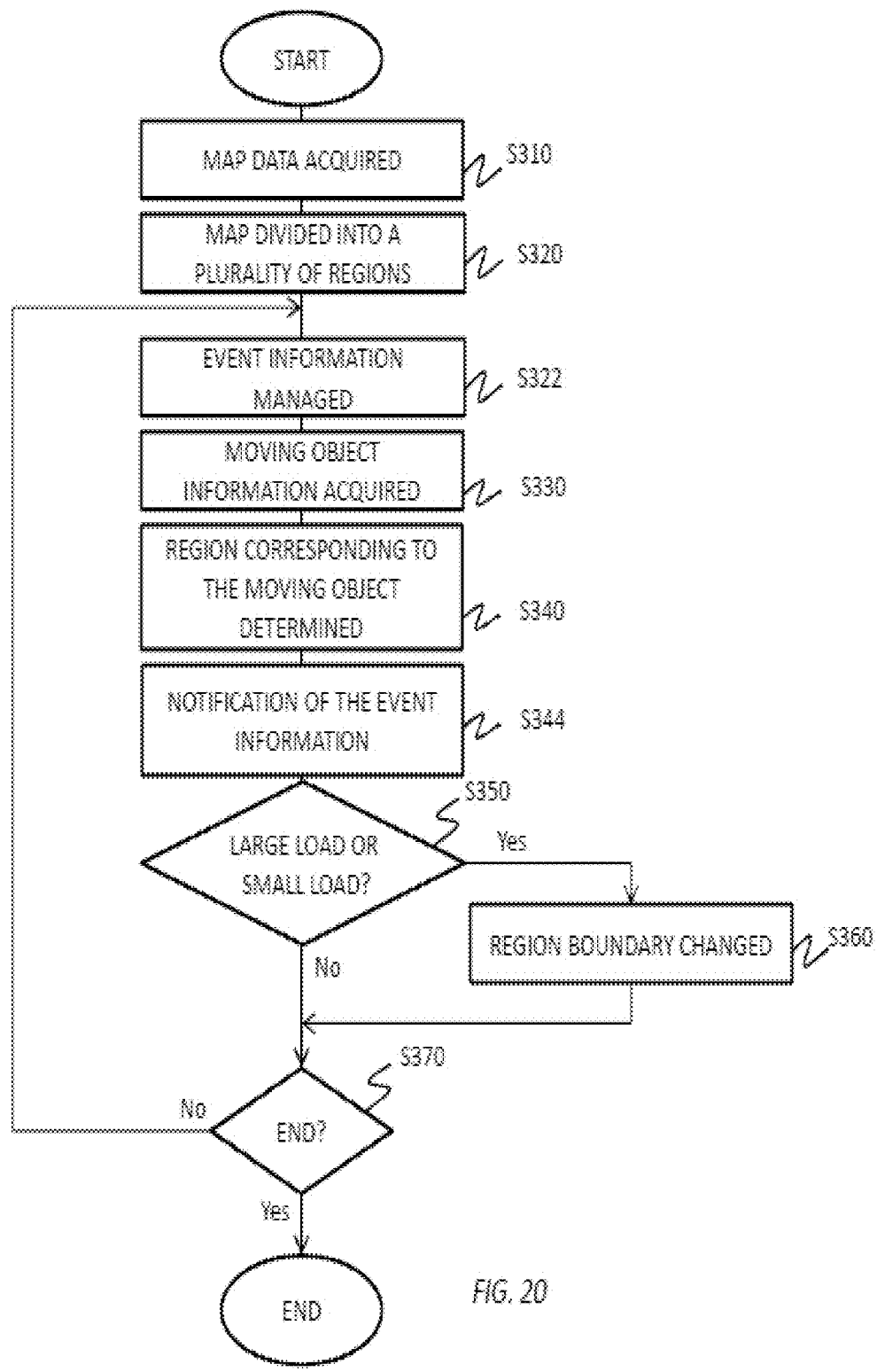
FIG. 20 shows an operational flow of a system, according to an embodiment of the present invention.

FIG. 20 shows an operational flow of a system, according to an embodiment of the present invention. The present embodiment describes an example in which a system, such as the system 100 of FIG. 19, performs the operations from S310 to S370 shown in FIG. 20, to efficiently notify a moving object about event information while dynamically balancing the loads of the plurality of subsystems. FIG. 20 shows an exemplary operational flow of the system 100 shown in FIG. 19, but the operational flow shown in FIG. 20 is not limited to this system. The description of the operational flow in this embodiment omits descriptions that are based on the operations described in FIG. 3, but the operational flow shown in FIG. 20 is not limited by the operational flow shown in FIG. 3.

An acquiring section, such as the acquiring section 110, may acquire map data of the geographic space to be managed by the system (S310). Next, an analyzing section, such as the analyzing section 120, may analyze the acquired map area and a dividing section, such as the dividing section 130, may divide the map area according to the analysis (S320). These operations may be performed in the same manner as the operations described in FIG. 3, and therefore further description is omitted.

Next, the subsystems that respectively manage the regions resulting from the division may manage the event information in each region (S322). Specifically, the managing section of each subsystem may search for routes in the management target region and hold event information occurring in these routes as the individual event information. Furthermore, the managing section of at least one subsystem among the plurality of subsystems may hold, in addition to the individual event information, adjacent event information for a portion of an adjacent region.

Next, a receiving section, such as the receiving section 150, may receive information transmitted from each of a plurality of moving objects (S330). After this, in response to a request from a gateway apparatus, such as the gateway apparatus 160, the region manager may determine the regions where each of the moving objects is positioned, based on the position information received from the moving objects, and may determine the subsystems to manage the maps of these regions from among the plurality of subsystems (S340).

The gateway apparatus may transfer, to each subsystem determined by the region manager to correspond to a piece of position information, the corresponding piece of position information. The subsystems may perform management by performing mapping on the maps of the management target regions based on the received position information.

Each event selecting section, such as even selecting section 230, may select the events about which a moving object is to be notified, from among the individual event information managed by the corresponding subsystem. Due to a subsystem managing the individual event information and adjacent event information, the corresponding event selecting section may select the events about which the moving object is to be notified from among the individual event information and the adjacent event information.

The subsystems may supply the event information to the gateway apparatus in order to notify the corresponding moving object about the events, according to the selection results of the event selecting sections. The gateway apparatus may notify the corresponding moving object about the event information, via a transmitting section, such as the transmitting section 152 (S344).

The region manager may determine whether or not the load placed on each subsystem is large (or small) (S350). If the load of one or more of the subsystems is determined to be large or small (S350: Yes), the region manager may change the boundary of the region managed by the subsystem whose load was determined to be large or small (S360). If instructions for suspending or stopping the operation have not been received, the system may return to the operation (S330) of receiving information from the moving objects 10 and continue managing the subsystems. The operations of S350 to S370 described above may be performed in substantially the same manner as the operations described in FIG. 3, and therefore further description is omitted.

As described above, at least one subsystem may manage the individual event information and adjacent event information, and select events about which a moving object is to be notified from the individual event information and the adjacent event information, and notify the moving object about these events. In this way, by managing the adjacent event information for a route that runs in a serpentine manner at a boundary of the management target region, a subsystem can search for events occurring on this route and notify a moving object moving on this route about the event information that has been found.

Accordingly, even though a route may run in a serpentine manner at a boundary of a management target region, the system can notify the moving object moving on this route about the event information without transferring management between subsystems adjacent to this boundary, and can therefore prevent an increase in the loads. Furthermore, the system can dynamically change the boundaries of the regions managed by the subsystems according to the respective loads of the subsystem, while providing notification about the event information, and can adjust the balance of the loads of the subsystems in accordance with dynamic changes such as events and moving objects 10.

Due to the managing section of a subsystem storing a history of a plurality of moving objects, the system may use this history to dynamically change the boundary of the management target region. For example, in response to the changing the boundary of a subsystem, the region manager may instruct the subsystem to change the boundary to be at a position where there is less history of moving object movement, based on the history stored by the managing section. For example, the subsystem may calculate the maximum movement distance of a moving object from the boundary in a prescribed time based on the movement history, and may change this boundary to be at a position farther from the boundary than the maximum movement distance. The subsystem may change the boundary such that the boundary after the change results in a lower traffic amount crossing the boundary compared to the traffic amount before the change.

Figure 21:
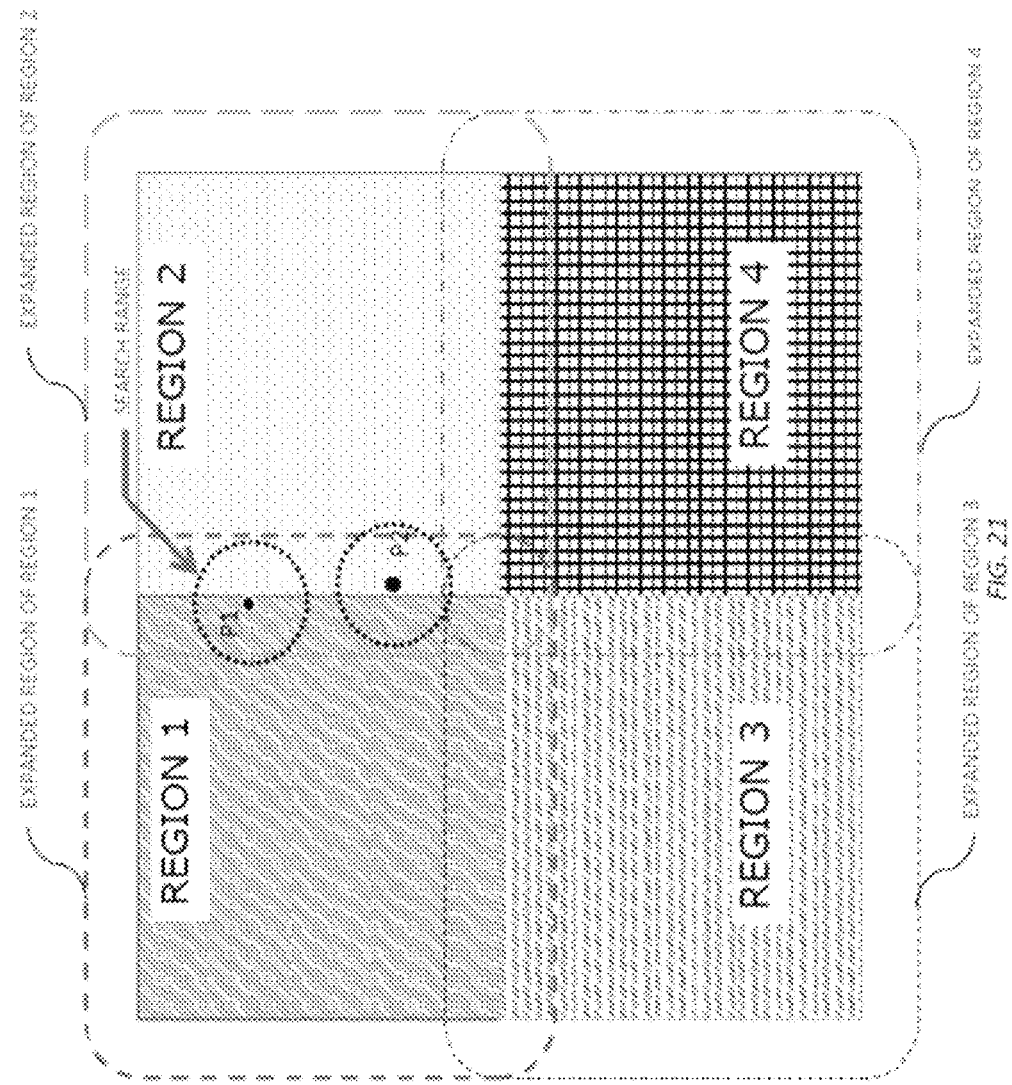
FIG. 21 shows an example of a management target region in a case where each of a plurality of subsystems manages the individual event information and adjacent event information, according to an embodiment of the present invention.

FIG. 21 shows an example of management target region in a case where each of a plurality of subsystems manages the individual event information and adjacent event information, according to an embodiment of the present invention. FIG. 21 shows an example in which a first subsystem manages region 1, a second subsystem manages region 2, a third subsystem manages region 3, and a fourth subsystem manages region 4.

FIG. 21 shows an example in which each subsystem manages, as the adjacent event information, events occurring in a range from a boundary of the management target region in a direction outward from the management target region. The first subsystem may set an expanded region for region 1 that extends beyond region 1 in the range shown by the dotted lines, and manage the events occurring in this expanded region as the adjacent event information. In the same manner, each of the second to fourth subsystems may manage, as the adjacent event information, events occurring in an expanded region shown outside of the boundary of the management target region.

Each managing section may search for events within a range from each intersection location on the boundary of the management target region. For example, the managing section of the first subsystem may search for events in a range from position P1 on the route in the management target region. In the same manner, the managing section of the second subsystem may search for events in a range from position P2 on the route in the management target region. As a result of the searches by the managing sections, two or more subsystems may all manage a single event.

Figure 22:
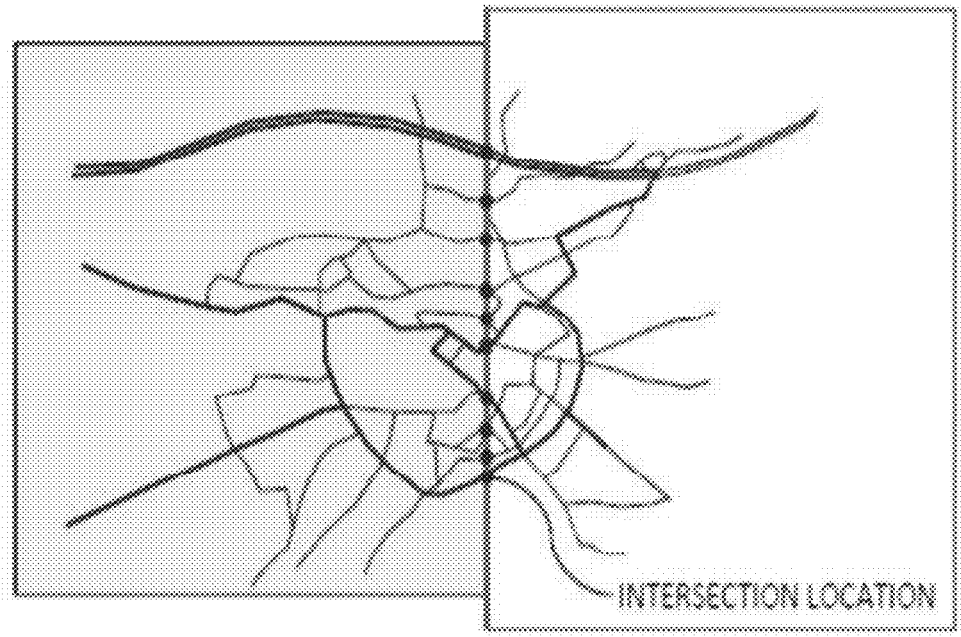
FIG. 22 shows a first example of the results of a plurality of managing sections searching for events from each intersection location, according to an embodiment of the present invention.

FIG. 22 shows a first example of the results of a plurality of managing sections searching for events from each intersection location, according to an embodiment of the present invention. Among the routes shown in FIG. 22, examples of search ranges are shown by the solid lines. FIG. 22 shows an example in which each managing section searches for events occurring in a range from each intersection location, and holds these events.

Figure 23:
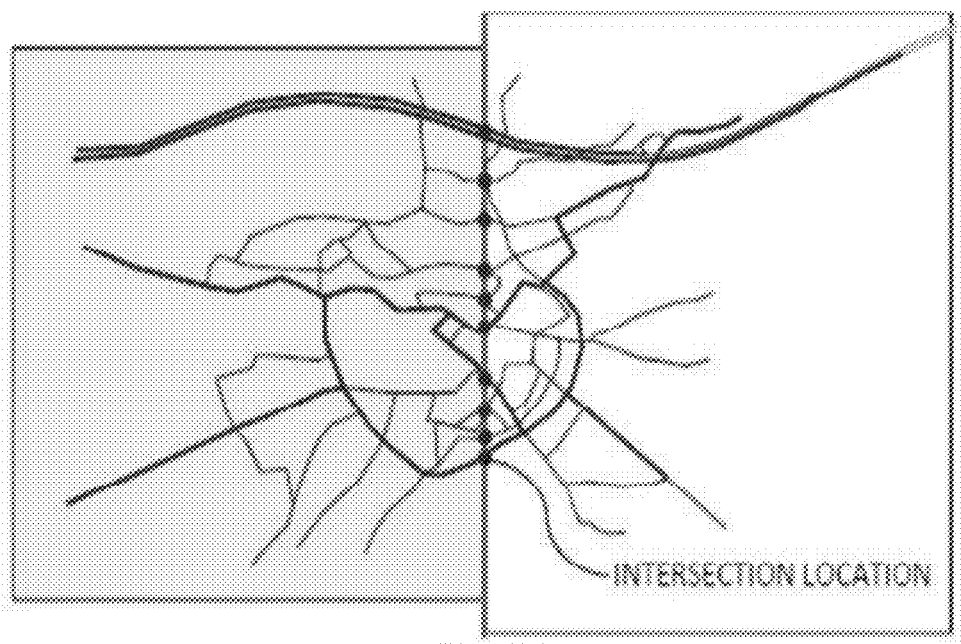
FIG. 23 shows a second example of results obtained by the plurality of managing sections searching for events from each intersection location, according to an embodiment of the present invention.

FIG. 23 shows a second example of results obtained by the plurality of managing sections searching for events from each intersection location, according to an embodiment of the present invention. Among the routes shown in FIG. 23, examples of search ranges are shown by the solid lines. FIG. 23 shows an example in which each managing section searches for events occurring in a distance range that can be reached by a moving object from each intersection location within a predetermined threshold time, and holds these events. In this case, routes such as freeways and roads only for automobiles tend to result in a longer reachable distance within the prescribed time than normal roads, and routes such as one-lane roads and local roads tend to result in a shorter reachable distance within the prescribed time than normal roads.

In response to an update of the map corresponding to the geographic space, the map managed within the system may also be updated. In this way, even though the map of an application used by a moving object may be updated, the system can exchange information using the corresponding map. The system may hold information concerning past versions of this map. In this way, even though the application used by the moving object may be using a past version of the map, the system can exchange information using the corresponding map.

Figure 24:
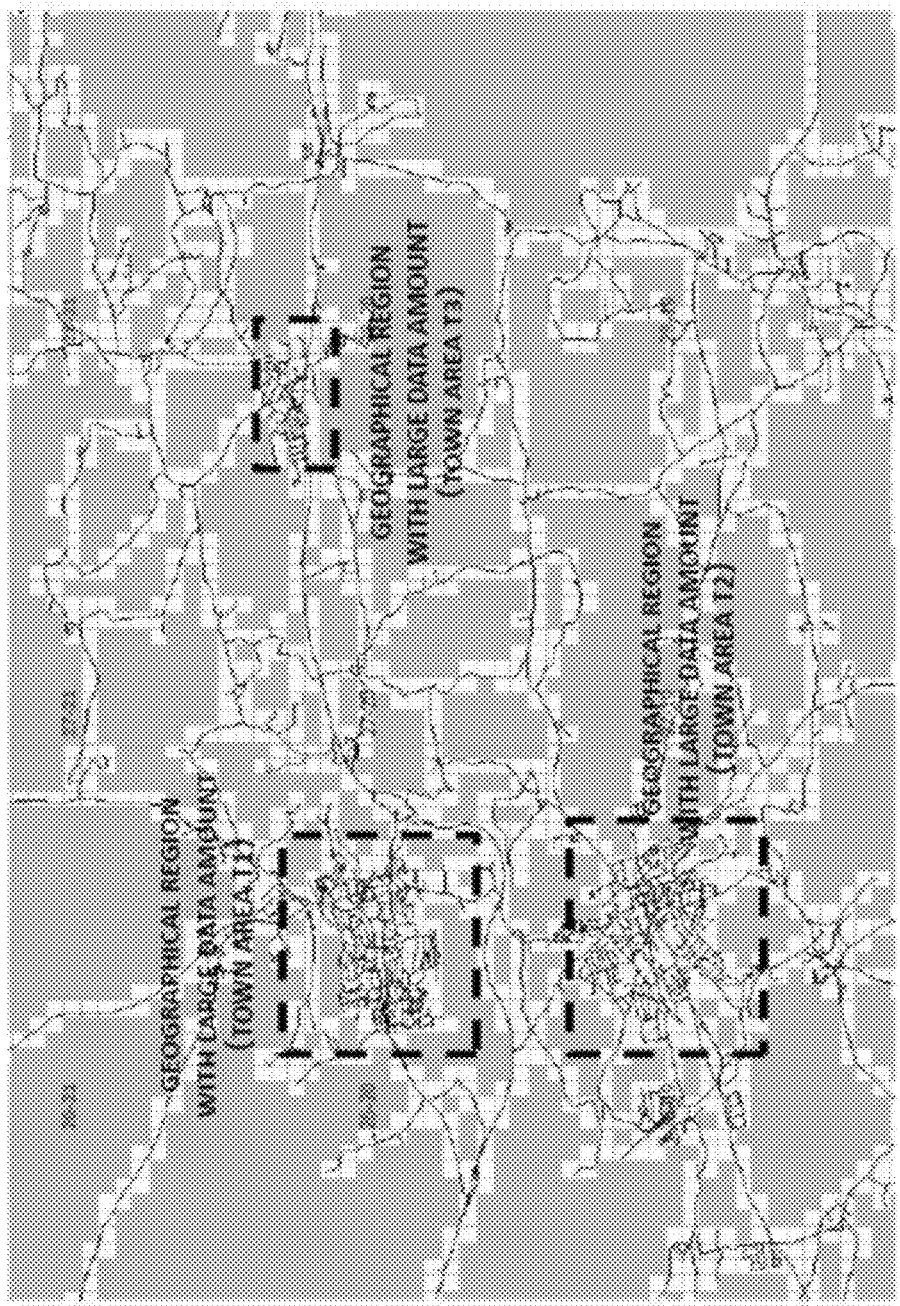
FIG. 24 shows an example of a map corresponding to a geographic space managed by a system according to an embodiment of the present invention.

FIG. 24 shows an example of a map corresponding to a geographic space managed by the system, according to an embodiment of the present invention. FIG. 24 shows an example of a map that includes a town T1, a town T2, and a town T3. The number of routes, buildings, and the like is greater in places with focused populations, such as towns, and therefore there is a greater amount of map data in such places. Changes in the routes or buildings in geographical locations with focused populations occur more quickly than changes in geographical region where there are few people, and therefore changes that accompany a map update tend to be focused in geographical locations with greater populations. In this case, there are cases where the map update is performed only in geographical locations with greater populations.

Figure 25:
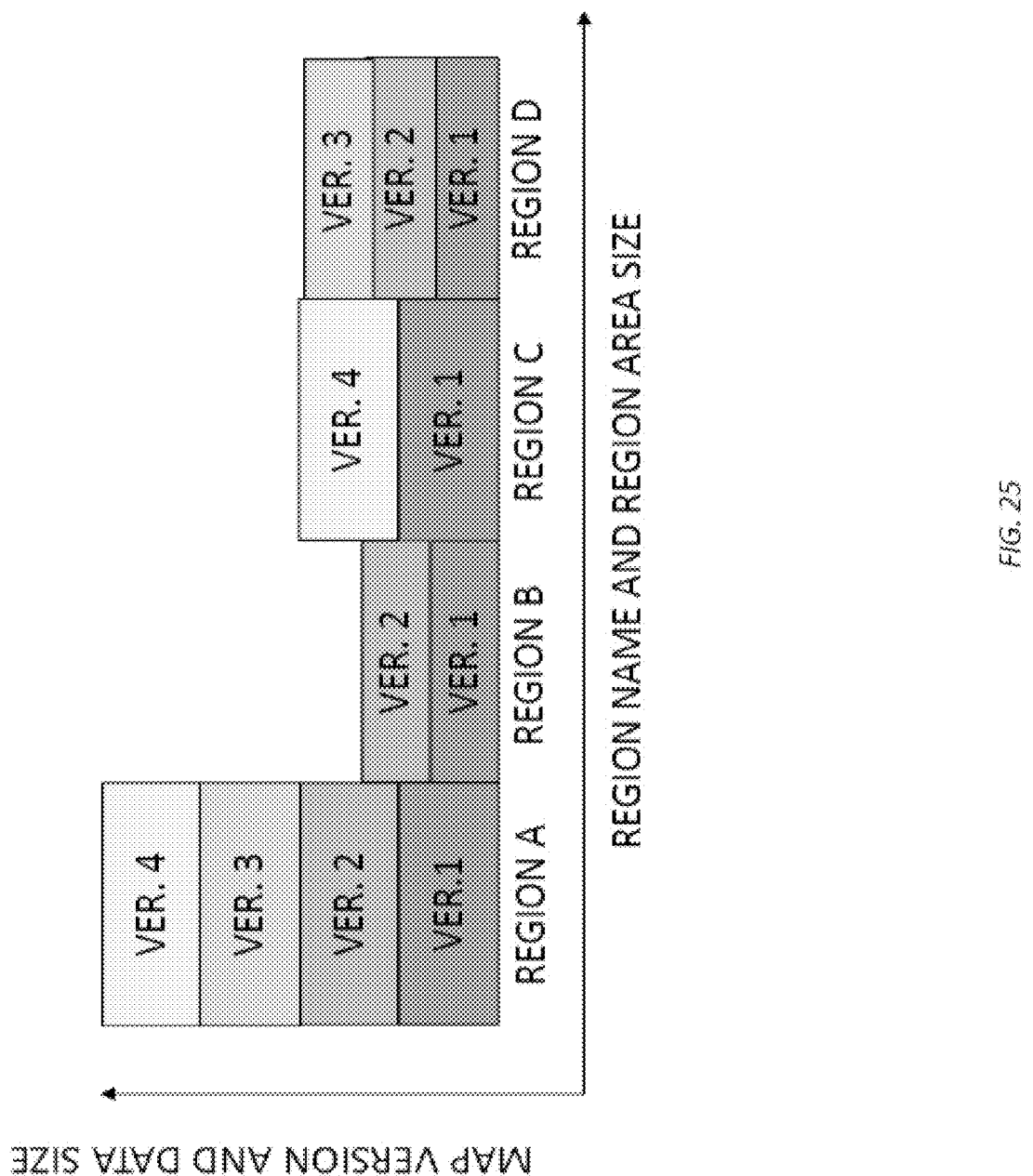
FIG. 25 shows an example of data fluctuation in each region that accompanies an update of a map used by a system, according to an embodiment of the present invention.

Specifically, the map data for regions including town T1, town T2, and town T3 increases by a greater amount than the map data for other regions. FIG. 25 shows an example of data fluctuation in each region that accompanies an update of the map used by the system, according to an embodiment of the present invention. FIG. 25 shows regions in the horizontal axis direction and shows the data size for each version on the vertical axis. For example, region A is shown to be updated sequentially from version 1 to version 4 with each update having approximately the same data size. In other words, region A is updated frequently and the total update data size is greater than that of other regions.

Region B is updated only in versions 1 and 2, and the update data size for each update is smaller than the update data size of region A. In other words, region B is updated infrequently and has a total update data size that is less than in other regions. Region C and region D each have an update frequency and update data size smaller than those of region A, but greater than those of region B.

In this case, the subsystem managing region A has a higher load due to managing a larger data amount than in the other regions, and so the load is focused on this subsystem, and the efficiency of the system is reduced. Therefore, the system may reduce the update data size by changing the management target region of each subsystem.

Figure 26:
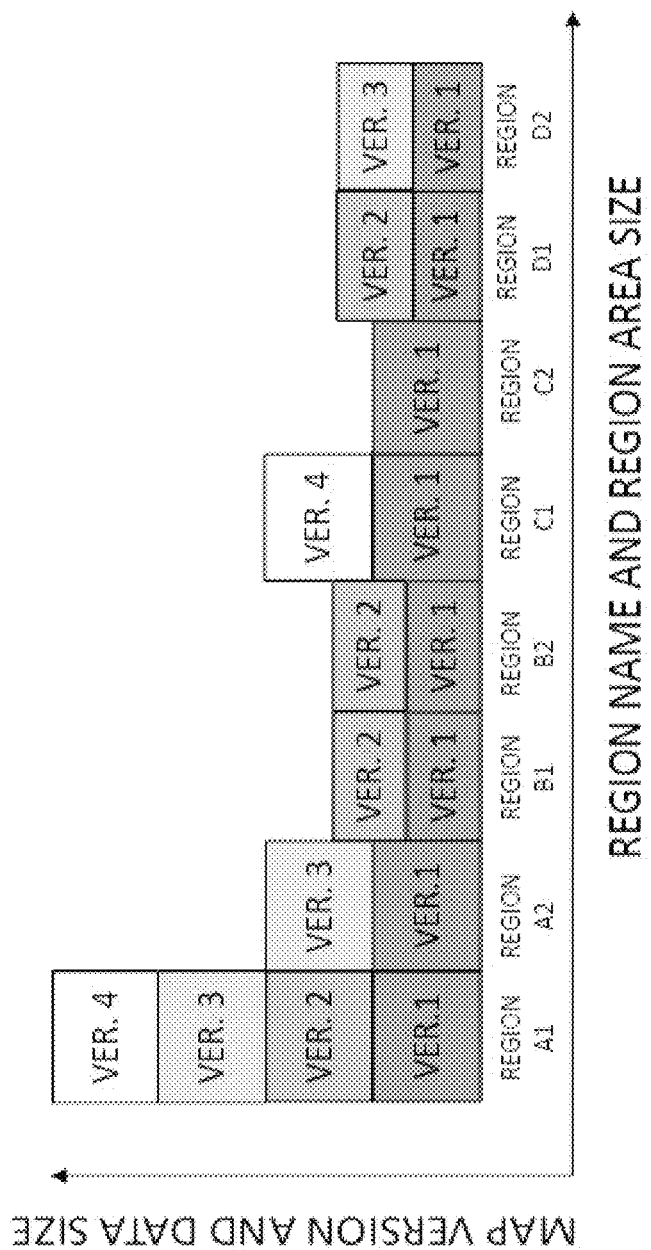
FIG. 26 shows an example in which the system changes the management target regions of a plurality of subsystems, according to an embodiment of the present invention.

FIG. 26 shows an example in which the system changes the management target regions of a plurality of subsystems, according to an embodiment of the present invention. FIG. 26 shows an example in which the system divides each of four regions in half, to form eight regions. The system may use four new subsystems so that the eight regions are managed respectively by a total of eight subsystems.

In a case where the area size of a management target region is greater than that of an update block that is a unit of geographical area for updating the map data, the management target region includes both update blocks with high update frequency and update blocks with low update frequency. Therefore, as an example, the system 100 according to the present invention may perform the division by grouping together in one region many update blocks with a high update frequency in the regions before division and grouping together in another region many update blocks with a low update frequency, thereby decreasing the update data size after the division.

FIG. 26 shows an example in which the system divides region A shown in FIG. 25 into region A1 and region A2, according to an embodiment of the present invention. In this example, among the blocks in region A before division, the system groups together the update blocks with high update frequency in region A1 and groups together the update blocks with low update frequency in region A2. In this way, the update data size of region A1 becomes approximately half of the data size of region A, and the update data size of region A2 becomes approximately ¼ of the data size of region A.

FIG. 26 shows an example in which, in the same manner, the system divides each of region C and region D in half, to decrease the update data size after the division. In a case where the region before the division includes a plurality of update blocks with almost no differences in update frequency, the update data size will barely change as a result of dividing this region. Region B in FIG. 25 shows an example of such a region, where even though the system divides region B into region B1 and region B2, there is almost no change in the total update data size, as shown in FIG. 26. In such a case, two subsystems manage the two regions resulting from the division, and therefore the update data size that is processed by each subsystem is no greater than half, thereby lowering the load on each subsystem.

In this way, the system can decrease the loads on the subsystems by reducing the area size of the management target regions. Furthermore, by combining regions with small update data sizes, the system can increase the load on one subsystem that has a relatively small load, and put the other subsystem on standby. In other words, the system according to the present embodiment may change the management target regions in a manner to make the update data sizes more uniform, and can therefore optimize the loads of the subsystems. The system may change the management target regions in update block units.

Figure 27:
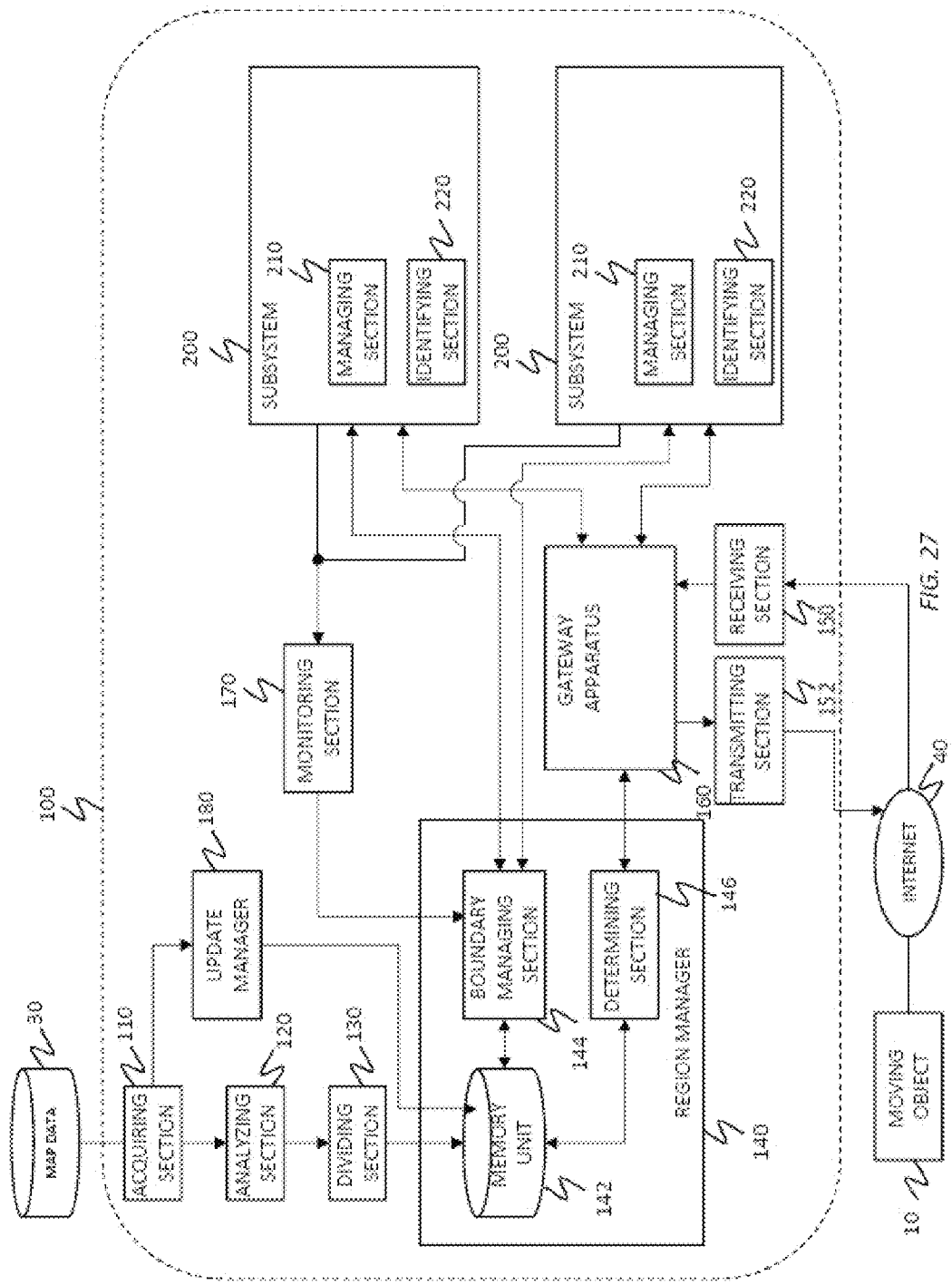
FIG. 27 shows an exemplary configuration of a system, according to an embodiment of the present invention.

FIG. 27 shows an exemplary configuration of a system 100, according to an embodiment of the present invention. In this embodiment, the system 100 includes an update manager 180. All components other than the update manager 180 in the system 100 may have substantially the same operation as the components in the system 100 in FIG. 2. The description of the system 100 omits the descriptions of all components other than the update manager 180, but the operation of the system 100 of this embodiment is not limited to the operation of the system 100 in FIG. 2.

The update manager 180 may be operable to change boundaries of the update blocks serving as update units in a map, according to the extent to which the update blocks are updated. The subsystems 200 respectively manage the maps of a plurality of regions, and the update manager 180 may be operable to change a boundary of at least one of the plurality of regions based on the extent to which the map corresponding to the at least one region is updated.

The map may include at least one update block corresponding to each of a plurality of regions. In this case, the update manager 180 may be operable to change the boundary of the update block based on the extent to which the update block in the at least one region among the plurality of regions is updated. The update manager 180 may be operable to change the boundary of a region in update block units.

The update manager 180 may be operable to change the boundary of an update block based on at least one of the update frequency, the update data amount, the number of update files, the update data loading time, and the update load of the map corresponding to the update block. The update manager 180 may communicate with the acquiring section 110 to acquire information concerning the update frequency, the update data amount, the number of update files, and the update data loading time of the map corresponding to the update block. The update manager 180 may communicate with the region manager 140 to acquire information concerning the update frequency, the update data amount, the number of update files, the update data loading time, and the update load of the map.

Figure 28:
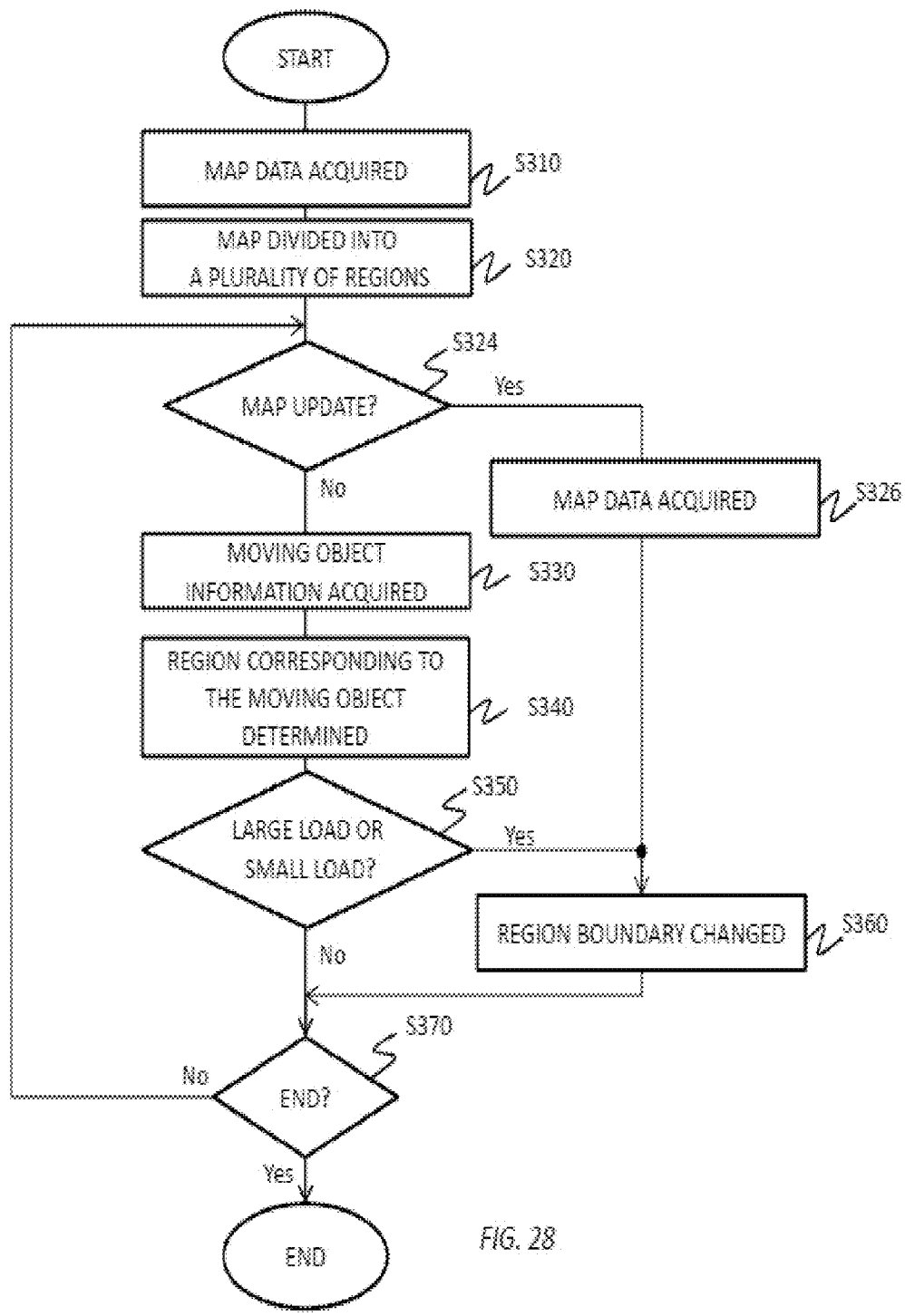
FIG. 28 shows an operational flow of a system, according to an embodiment of the present invention.

FIG. 28 shows an operational flow of a system, according to an embodiment of the present invention. The present embodiment describes an example in which the system performs the operations from S310 to S370 shown in FIG. 28 to dynamically adjust the balance of the loads of a plurality of subsystems while updating the map data. FIG. 28 shows one example of the operational flow of the system 100 shown in FIG. 27, but the system 100 shown in FIG. 27 is not limited to using this operational flow. Furthermore, the operational flow shown in FIG. 28 omits descriptions based on operations described in FIG. 3, but is not limited to the operational flow shown in FIG. 3.

An acquiring section, such as the acquiring section 110, may acquire the map data of the geographic space to be managed by the system (S310). Next, an analyzing section, such as the analyzing section 120, analyzes the acquired map area, and a dividing section, such as the dividing section 130, may divide the map area according to this analysis (S320). The operations described above may be performed in the same manner as the operation described in FIG. 3, and therefore further description is omitted.

Next, an update manager, such as the update manager 180, may check whether the map has been updated, via the acquiring section (S324). If the map has not been updated (S324: No), then a receiving section, such as the receiving section 150, may receive information transmitted from each of the moving objects (S330). Next, in response to the request from a gateway apparatus, such as the gateway apparatus 160, the region manager may determine the regions in which the moving objects are positioned, based on the position information received from each of the moving objects, and may determine the subsystem for managing the maps of these regions from among the plurality of subsystems (S340).

The region manager may determine whether or not the load placed on each subsystem is large (or small) (S350). If the load of one or more of the subsystems is determined to be large or small (S350: Yes), then the region manager may change the boundary of the region managed by the subsystem whose load was determined to be large or small (S360). If instructions for suspending or stopping the operation have not been received, then the system may return to the operation (S330) of receiving information from the moving objects, and continue managing the subsystems. In other words, if the map has not been updated, then the system may manage the management target region by performing substantially the same operations as described in FIG. 3, and therefore further description is omitted.

On the other hand, if the map has been updated (S324: Yes), then the update manager may acquire the updated map data via the acquiring section (S326). Here, the update manager may acquire the information concerning the extent to which the update block is updated, such as the update frequency, the update data amount, the number of update files, and the update data loading time of the map corresponding to the update block.

The update manager may update the map data in the system based on the updated map data. For example, the update manager may store the updated map data in a memory unit, such as the memory unit 142, of the region manager, and the region manager may supply the plurality of subsystems with the stored map data. The update manager may transmit the updated map data to the plurality of subsystems.

The update manager may change the boundary of the update block in at least one of the plurality of regions, based on the extent to which the update block is updated. Furthermore, the update manager may update the boundary of at least one of the plurality of regions, based on the extent to which an update block within the region is updated (S360).

The update manager may be operable to divide an update block into a plurality of update blocks, if the extent to which the update block is updated is greater than or equal to an upper limit value. In other words, if the update frequency, the update data amount, the number of update files, the update data loading time, and/or the update load of the map for an update block exceeds a reference value, then the update manager may divide this update block. The update manager may change the boundary of a region having an update block in response to the division of the update block. The update manager may change the boundary in a manner to divide this region.

The update manager may be operable to combine a plurality of adjacent update blocks and merge these update blocks into a new update block, if the total extent to which these update blocks are updated is less than or equal to a lower limit value. In other words, if the update frequency, the update data amount, the number of update files, the update data loading time, and/or the update load of the map for a plurality of update blocks is less than or equal to a reference value, then the update manager may combine these update blocks. The update manager may change the boundary of the region including the new update block in response to update blocks being combined. The update manager may change the boundary in a manner to combine these regions. The update manager may change the boundary of a region including a changed update block in response to the changed boundary of this update block.

The update manager may store information concerning the boundaries of the regions and the boundaries of the update blocks that have been changed in the memory unit of the region manager. The region manager may supply the subsystems with the stored map data. The subsystems may manage the management target regions based on the changed map data. In other words, the operation may return to S330 for receiving the information from the moving objects, and the management of the subsystems may continue.

In this case, the subsystem may be operable to acquire version information of the map possessed by the moving object, and to reflect the updated data in the update blocks according to the version designated by this version information. The subsystem may be operable to provide a service to the moving object, based on the update block that reflects the update data. In this way, the subsystem can manage the moving object in accordance with the version of the map used by the moving object.

In this way, the system may change the boundary of an update block and the boundary of a region, according to a map update. Therefore, the system can adjust the balance of loads among the subsystems by preventing an increase in the load of a subsystem caused by an increase in update data and preventing a decrease in a load of a subsystem caused by a small amount of update data. The system can also manage a plurality of map versions and manage a moving object in accordance with the map version used by the moving object.

Figure 29:
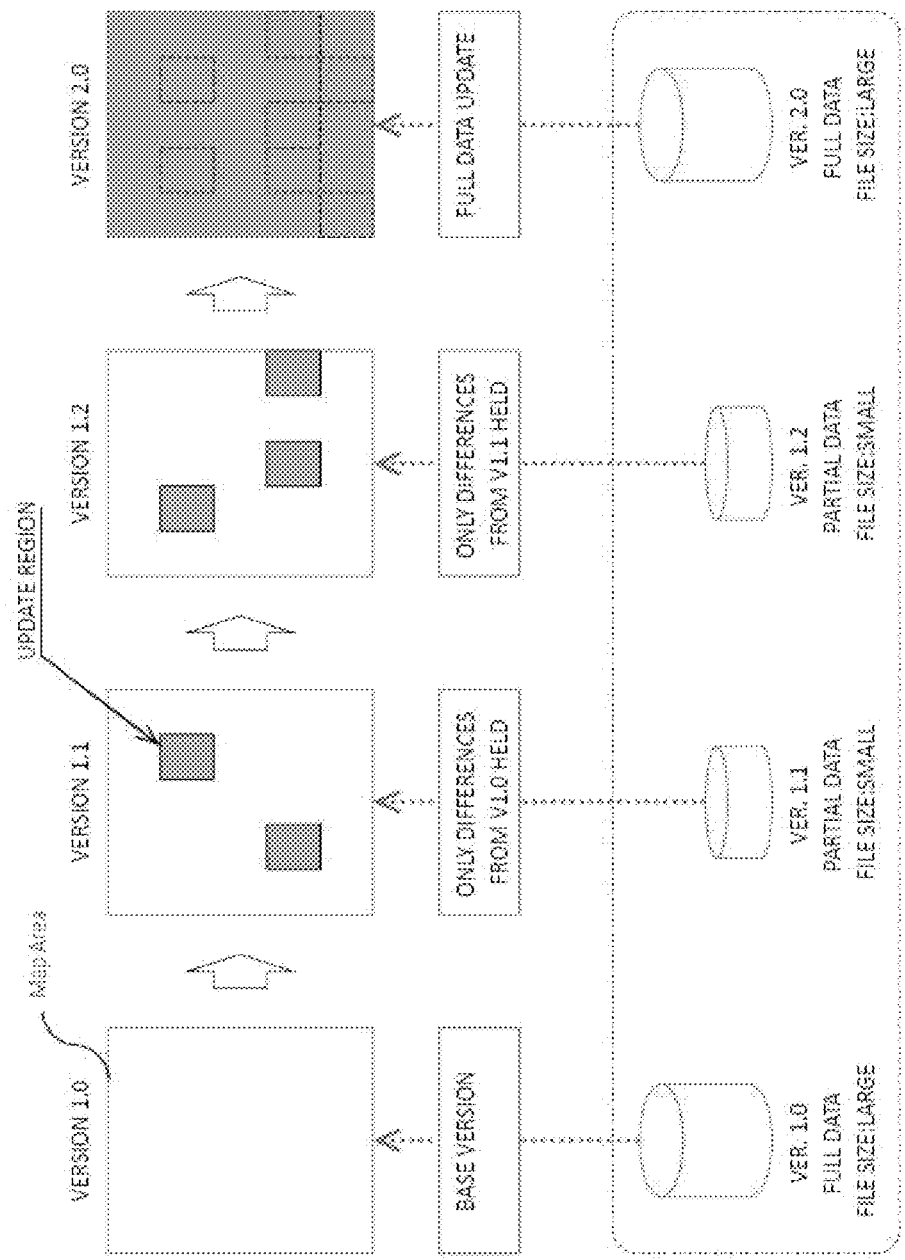
FIG. 29 shows an example of a map data update, according to an embodiment of the present invention.

In the system, the map update may be a full data update that performs an update for all geographical locations, or may instead be a differential data update that performs an update only for some geographical locations. FIG. 29 shows an example of a map data update, according to an embodiment of the present invention. FIG. 29 shows an example in which the map data of the map area is sequentially updated. FIG. 29 shows an example in which version 1.0 of the map data is the initial state, known as the base version. The map data of version 1.0 includes the data of the entire map area, and therefore may be the full data that has a large file size.

The map data in which a portion of the map area has been updated is set as version 1.1, and this map data may a differential data update from version 1.0 that has a smaller file size than the map data of version 1.0. Next, the map data in which a different portion of the map area has been updated is set as version 1.2, and this map data may be a differential data update from version 1.1 that has a smaller file size than the map data of version 1.0. Furthermore, map data in which the entire map area is updated is set as version 2.0, and this map data may be a full data update that has a file size approximately equivalent to the map data of version 1.0.

In this way, the map update may include sequentially updating partial geographical locations and then updating all regions. In this way, the system may change the boundaries of the update blocks and the boundaries of the regions according to partial updates and full updates.

Figure 30:
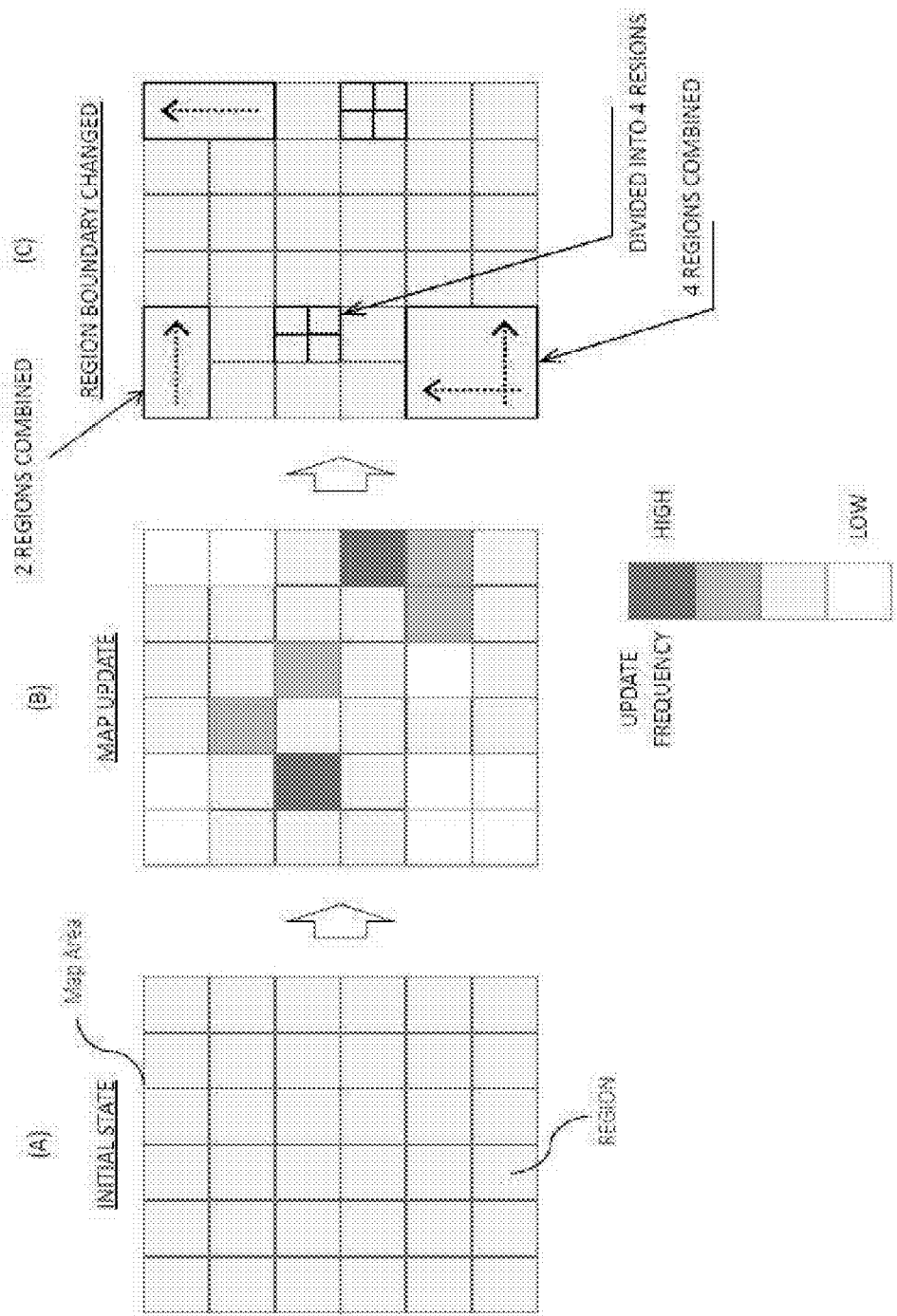
FIG. 30 shows an example in which the system changes the boundaries of update blocks and the boundaries of regions according to a map data update, according to an embodiment of the present invention.

FIG. 30 shows an example in which the system changes the boundaries of update blocks and the boundaries of regions according to a map data update, according to an embodiment of the present invention. FIG. 30(A) shows an example in which, first, the map area is divided in its initial state. In this case, the acquiring section may acquire the map data of the base version in the initial state, and the dividing section may divide the map area according to the analysis results of the analyzing section for the map data of the base version. The dividing section may divide the map area into shapes substantially equal to the shapes of the map data update blocks. FIG. 30(A) shows an example in which the map area is divided into shapes substantially equal to the square update regions.

The update manager may update the map in response to the map being updated. FIG. 30(B) shows results obtained by sequentially updating a portion of the map. For an updated map, the update manager may change the boundaries of the update blocks and the boundaries of the regions. FIG. 30(C) shows an example in which the update manager divides each region whose update frequency is higher than that of other regions into four regions. In accordance with this division, the update manager may divide each region having approximately the same shape as a region with a high update frequency into four regions. In this way, focusing of a load on a subsystem due to an increase in the update data can be prevented.

FIG. 30(C) shows an example in which the update manager combines each of a set of two regions and a set of four regions whose update frequencies are lower than those of other regions into one region. In accordance with this combining, the update manager may combine the corresponding regions having approximately the same shapes as the regions with low update frequency respectively into one region. In this way, the decrease in the load of a subsystem caused by regions with a smaller amount of update data than other regions can be prevented.

Figure 31:
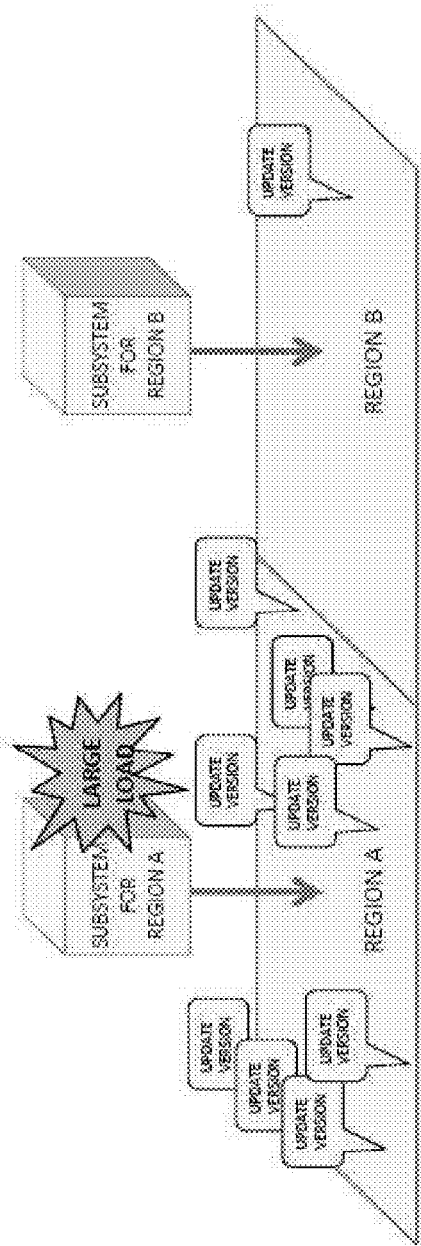
FIG. 31 shows an example in which the subsystems respectively manage regions that each includes a plurality of update blocks, according to an embodiment of the present invention.

FIG. 30(C) shows an example in which the subsystems manage regions having substantially the same shapes as the update blocks. Instead, the subsystems may manage regions that each includes a plurality of update blocks. FIG. 31 shows an example in which the subsystems respectively manage regions that each includes a plurality of update blocks, according to an embodiment of the present invention. FIG. 31 shows an example in which adjacent regions A and B are managed respectively by two subsystems.

Region A and region B may each include a plurality of update blocks. In other words, region A and region B may each experience updates of the map data for each portion within the region. FIG. 31 shows an example in which the map data update is performed at nine locations in region A and the map data update is performed at one location in region B. FIG. 31 shows an example in which, as a result of the map data updates, the load of the subsystem managing region A increases such that a load is focused on one subsystem in the system.

Figure 32:
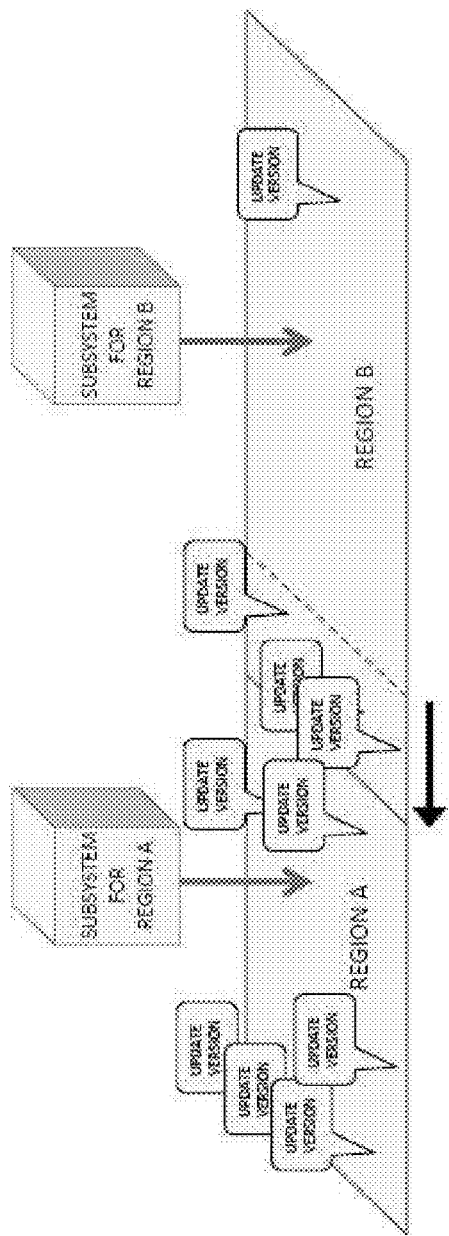
FIG. 32 shows an example in which the update manager changes the boundaries of adjacent regions, according to an embodiment of the present invention.

In this case, the system changes the boundary between region A and region B, in a manner to disperse the increased load on the subsystem managing region A. FIG. 32 shows an example in which the update manager changes the boundaries of the adjacent regions A and B, according to an embodiment of the present invention. In other words, FIG. 32 shows an example in which the update manager changes the boundary between region A and region B, which is shown by a dotted line, to the position shown by the solid line. In this example, the update blocks whose map data is updated in region A are reduced from nine locations to six locations, and the update blocks whose map data is updated in region B are increased from one location to four locations. In this way, the system can prevent the focusing of a load on a subsystem caused by an increase in the update data.

Figure 33:
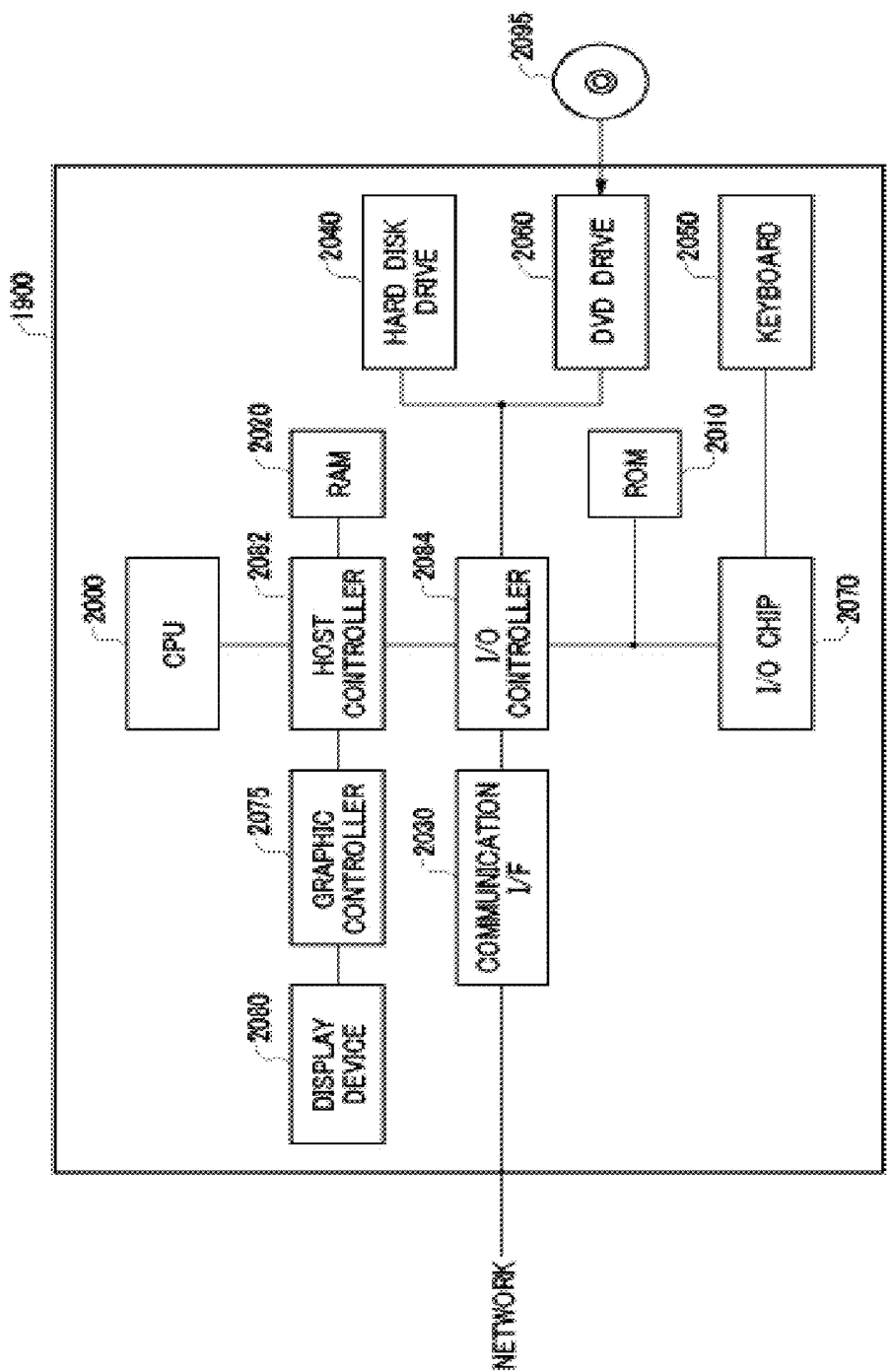
FIG. 33 shows an exemplary hardware configuration of a computer that functions as a system, according to an embodiment of the present invention.

FIG. 33 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as a system, such as system 100 of FIG. 1, includes an acquiring module, an analyzing module, a dividing module, a region managing module, a storage module, a boundary managing module, a determining module, a receiving module, a transmitting module, a gateway module, a judging module, a monitoring module, a subsystem module a managing module, and an identifying module. The program or module acts on the CPU 2000, to cause the computer 1900 to function as an acquiring section, an analyzing section, a dividing section, a region manager, a storage section, a boundary managing section, a determining section, a receiving section, a transmitting section, a gateway apparatus, a judging section, a monitoring section, a subsystem, a managing section, and an identifying section, such as the acquiring section 110, the analyzing section 120, the dividing section 130, the region manager 140, the storage section 142, the boundary managing section 144, the determining section 146, the receiving section 150, the transmitting section 152, the gateway apparatus 160, the judging section 162, the monitoring section 170, the subsystem 200, the managing section 210, and the identifying section 220 described above.

The information processing described in these programs is read into the computer 1900, to function as an acquiring section, an analyzing section, a dividing section, a region manager, a storage section, a boundary managing section, a determining section, a receiving section, a transmitting section, a gateway apparatus, a judging section, a monitoring section, a subsystem, a managing section, and an identifying section, which are the result of cooperation between the program or module and the above-mentioned various types of hardware resources. Moreover, the system is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer system for managing mobile objects comprising:
    one or more processors;
    one or more computer-readable memories;
    one or more computer-readable storage devices; and
    program instructions stored on at least one of the one or more computer-readable storage devices for execution by at least one of the one or more processors via at least one of the one or more computer-readable memories, the program instructions comprising:
    a subsystem for managing a map of a geographic space including a route, wherein managing the geographic space comprises managing a mobile object, and wherein the map of the geographic space comprises a first update block and a second update block, wherein the first update block and the second update block define a boundary in which an update to the map occurs, and wherein the first update block and the second update block share a common boundary;
    an update manager for managing updates to the map of the geographic space, wherein to prevent a load imbalance the update manager changes the common boundary between the first update block and the second update block based on an extent to which the first update block is updated, and wherein the extent to which the first update block is updated comprises an attribute selected from the group consisting of an update frequency, an update data amount, a number of update files, and an update data loading time of the map corresponding to the first update block, wherein the update manager divides the first update block into a plurality of update blocks if the update frequency that the first update block is updated exceeds a limit value.

2. The system of claim 1, further comprising a plurality of subsystems for managing the geographic space, wherein the geographic space is divided into a plurality of regions each managed by a subsystem.

3. The system of claim 2 wherein the update manager changes the boundary between two regions of the plurality of regions based on an extent to which the map of the two regions is updated.

4. The system of claim 2 wherein the update manager combines the first update block and a third update block of the map of the geographic space if the update frequency that the first update block is updated is below a limit value.

5. The system according to claim 1 wherein the subsystem is further operable to:
    acquire version information of a map possessed by a moving object,
    reflect update data in the first update block according to a version designated by the version information, and
    provide a service to a moving object based on the first update block that reflects the update data.

6. A computer system for managing mobile objects comprising:
    one or more processors;
    one or more computer-readable memories;
    one or more computer-readable storage devices; and
    program instructions stored on at least one of the one or more computer-readable storage devices for execution by at least one of the one or more processors via at least one of the one or more computer-readable memories, the program instructions comprising:
    a subsystem for managing a map of a geographic space including a route, wherein managing the geographic space comprises managing a mobile object, wherein the map of the geographic space comprises a plurality of update blocks and wherein each update block defines a boundary in which an update to the map occurs;
    an update manager for managing updates to the map of the geographic space, wherein to prevent a load imbalance the update manager changes the boundary between the plurality of update blocks for a plurality of regions based on an extent to which each update block is updated, and wherein the extent to which the update block is updated comprises an attribute selected from the group consisting of an update frequency, an update data amount, a number of update files, and an update data loading time of the map corresponding to the update block, wherein the update manager divides the update block into a plurality of update blocks if the update frequency that the update block is updated exceeds a limit value.

7. The system of claim 6, further comprising a plurality of subsystems for managing the geographic space, wherein the geographic space is divided into regions each managed by a subsystem.

8. The system of claim 7 wherein the update manager changes the boundary between two regions of the plurality of regions based on an extent to which the map of the two regions is updated.

9. The system of claim 7 wherein the update manager combines at least 2 of the plurality of update blocks of the map of the geographic space if the update frequency that the update block is updated is below a lower limit value.

10. The system according to claim 6 wherein the subsystem is further operable to:
    acquire version information of a map possessed by a moving object,
    reflect update data in the update block according to a version designated by the version information, and provide a service to a moving object based on the update block that reflects the update data.

\* \* \* \* \*